United States Patent
Okushita et al.

(10) Patent No.: US 8,434,212 B2
(45) Date of Patent: *May 7, 2013

(54) STATOR COIL PRODUCTION METHOD USING SHAPING PRESS PAIRS

(75) Inventors: Daisuke Okushita, Kariya (JP); Yusuke Hara, Anjo (JP); Takao Takeuchi, Handa (JP); Kiyokazu Futami, Obu (JP); Satoshi Nakamura, Nagoya (JP); Fumihiro Nakano, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,985

(22) Filed: May 13, 2011

(65) Prior Publication Data

US 2011/0277315 A1    Nov. 17, 2011

(30) Foreign Application Priority Data

May 13, 2010   (JP) ................................ 2010-111378

(51) Int. Cl.
  *H02K 15/04* (2006.01)
(52) U.S. Cl.
  USPC ................ 29/596; 29/597; 29/598; 29/605; 29/732
(58) Field of Classification Search ...... 29/564.1–564.4, 29/732, 596–598, 605–609; 310/208, 179
  See application file for complete search history.

(56) References Cited

U.S. PATENT DOCUMENTS

| 7,185,414 B2* | 3/2007 | Sadiku ............................ 29/598 |
| 2009/0199393 A1* | 8/2009 | Takada et al. ................... 29/596 |
| 2011/0277314 A1* | 11/2011 | Okushita et al. ................ 29/596 |
| 2011/0278980 A1* | 11/2011 | Hara et al. ..................... 310/208 |
| 2012/0001515 A1* | 1/2012 | Kudose et al. ......... 310/216.009 |

FOREIGN PATENT DOCUMENTS

JP    2009-194994    8/2009

* cited by examiner

*Primary Examiner* — Minh Trinh
(74) *Attorney, Agent, or Firm* — Nixon & Vanderhye PC

(57) ABSTRACT

A stator coil producing method and a stator coil production machine. The stator coil is used in an electric rotating machine. The stator coil production machine includes a rotary retainer which retains and moves shaping press pairs along a looped path to press or shape portions of a conductor wire into in-slot portions to be disposed in slots of a stator core and coil-end portions which extend outside the slots. The method comprises a coil-end portion shaping step of bringing press members of each of the shaping press pairs close to each other in sequence to shape the coil-end portions and an in-slot portion shaping step of advancing the shaping press pairs on the looped path in contact with the cam mechanism and also moving selected ones of the shaping press pairs in sequence in a direction perpendicular to the path to shape the in-slot portions.

6 Claims, 20 Drawing Sheets

HORIZONTAL DIRECTION
DEVELOPED CIRCUMFERENTIAL DIRECTION

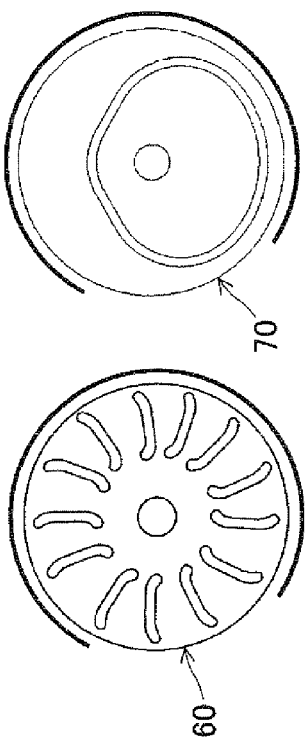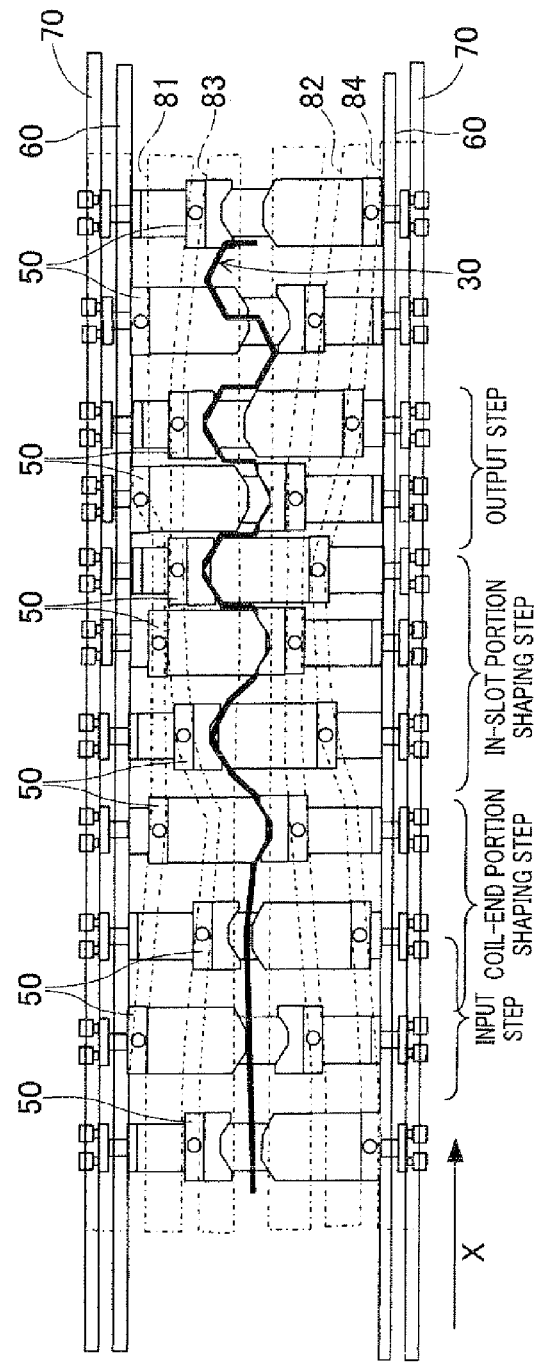
FIG. 14(a) FIG. 14(b) FIG. 14(c)

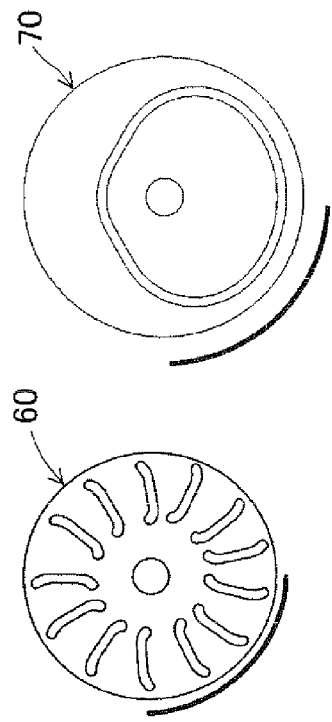
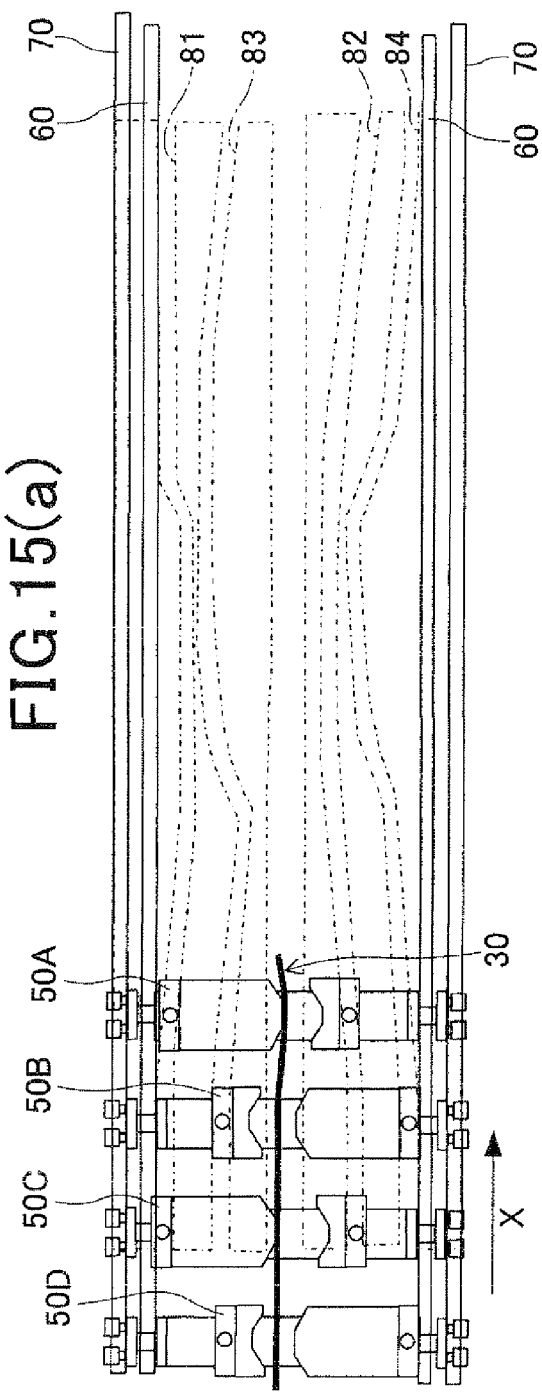

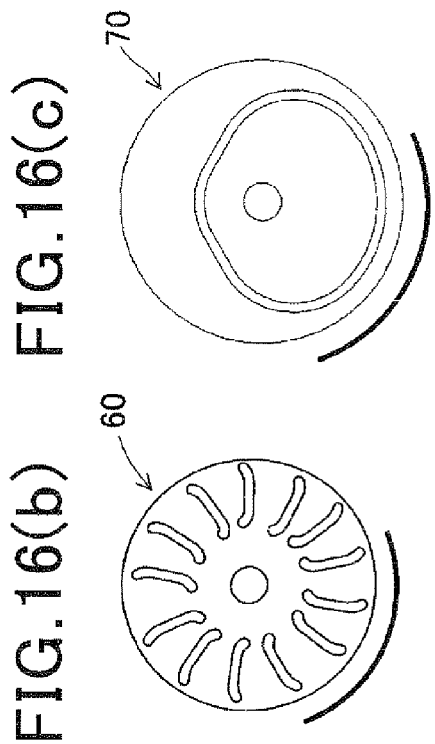
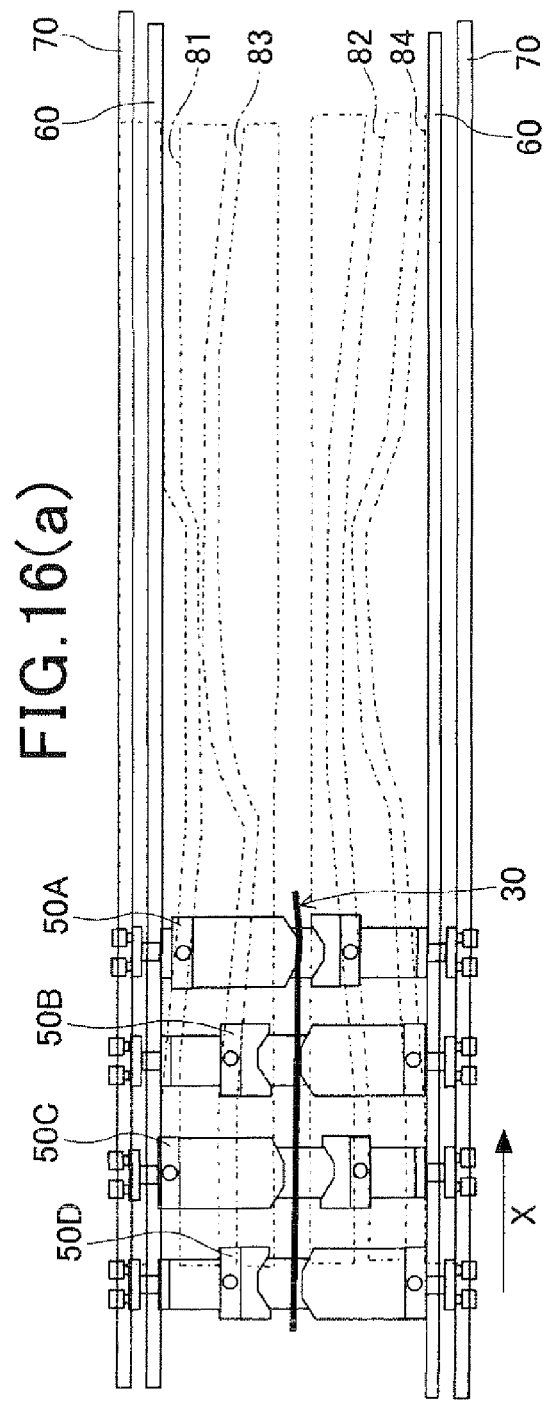
FIG.16(a) FIG.16(b) FIG.16(c)

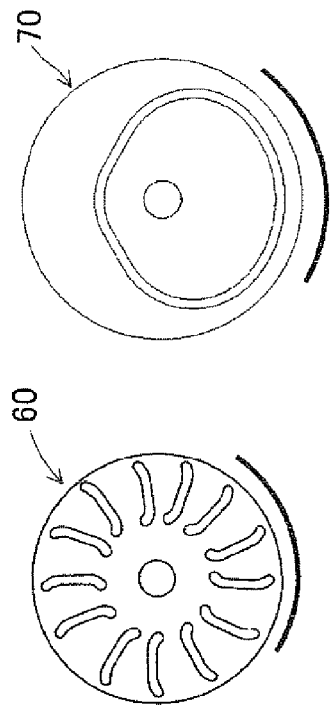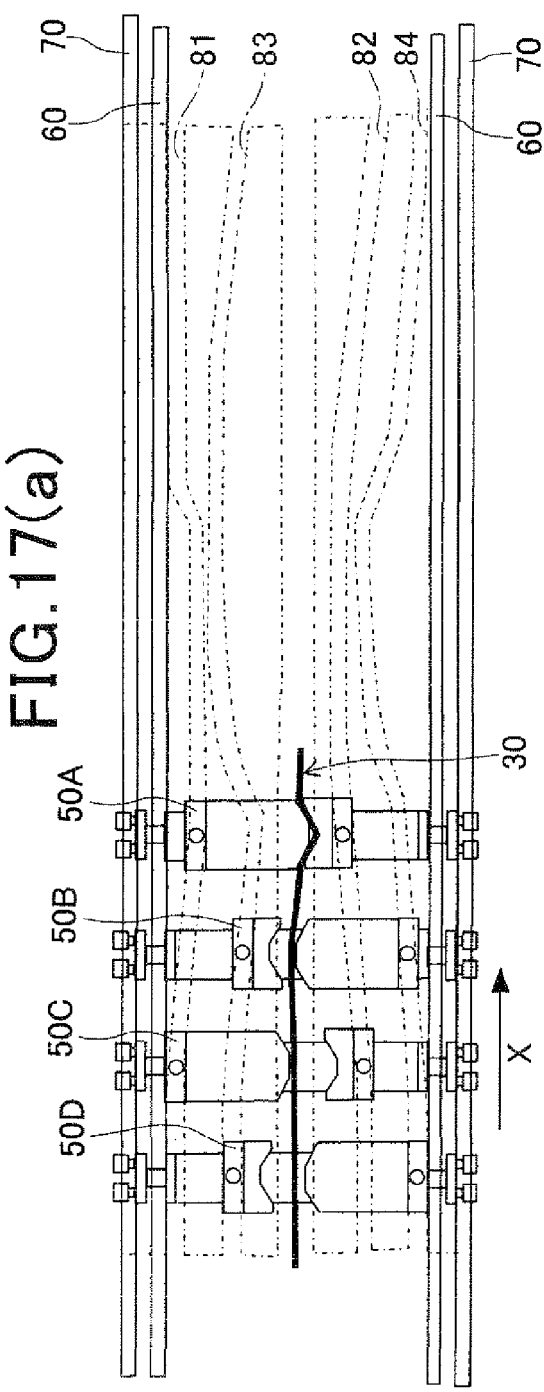

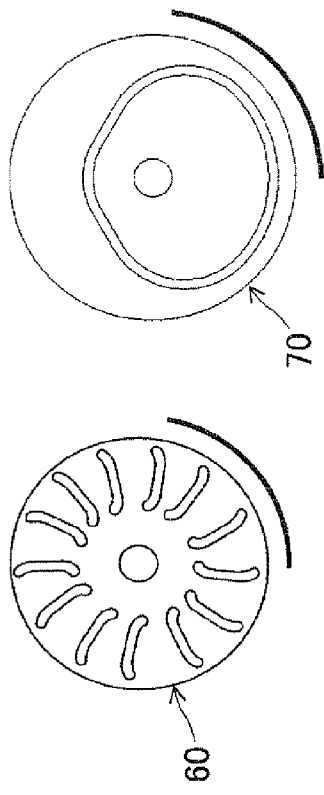
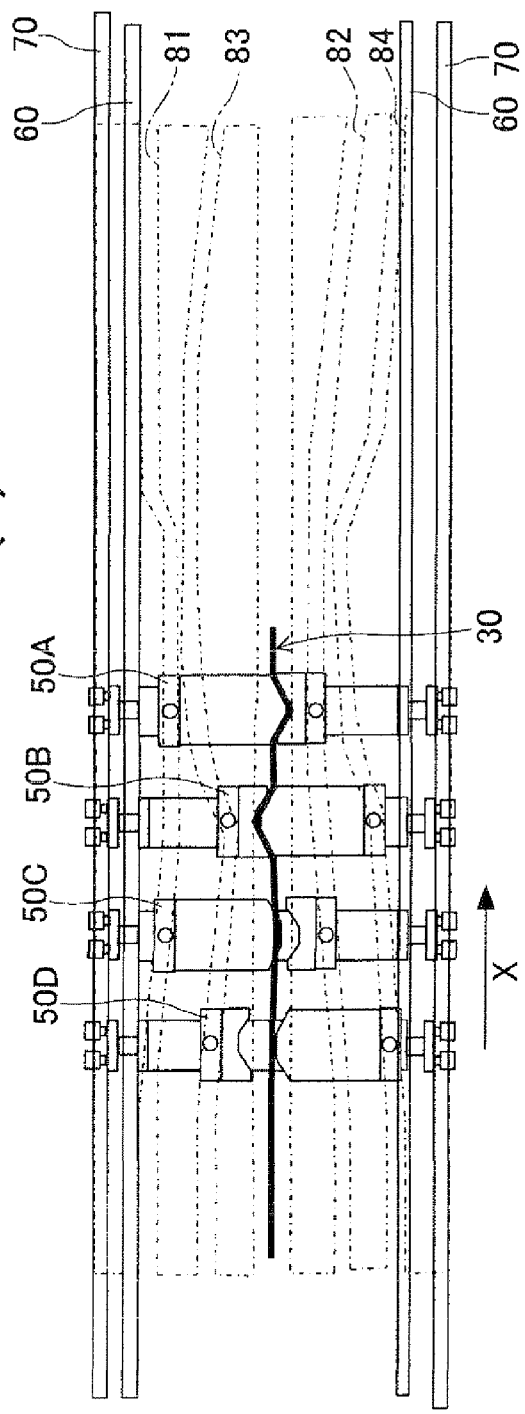

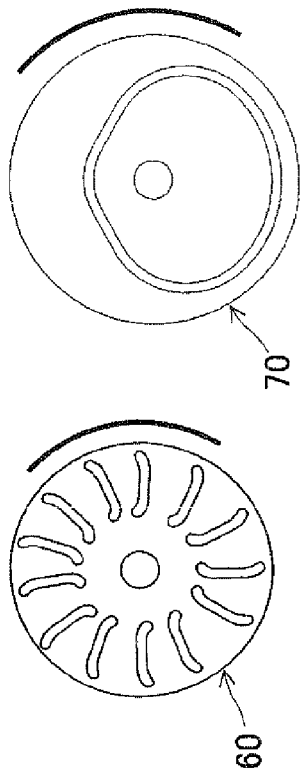
FIG.20(b)
FIG.20(c)
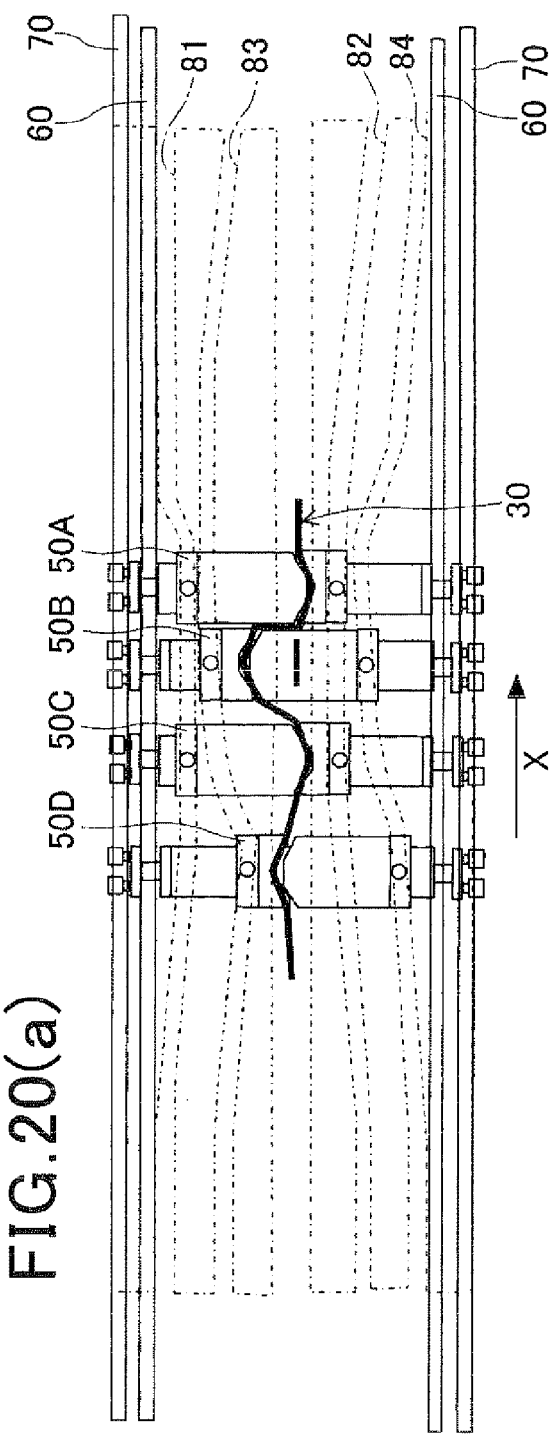
FIG.20(a)

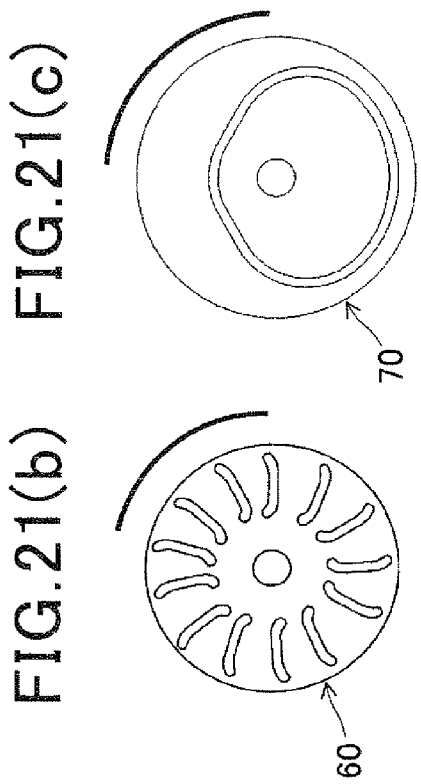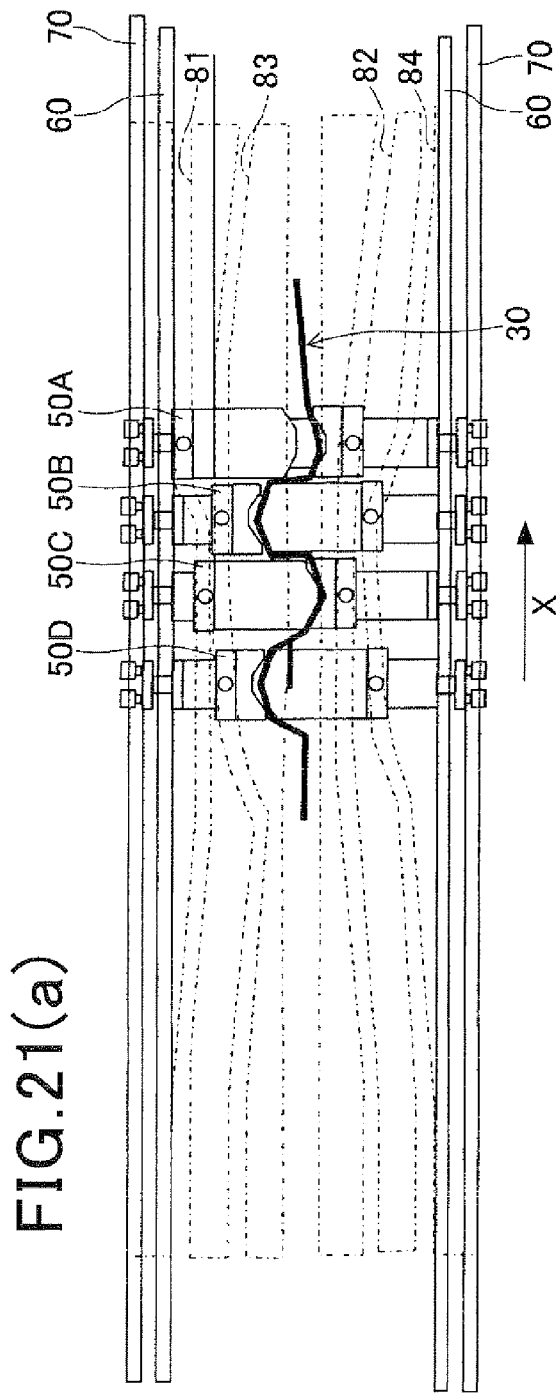

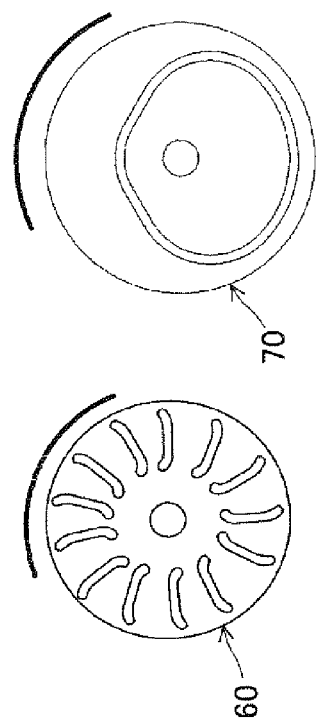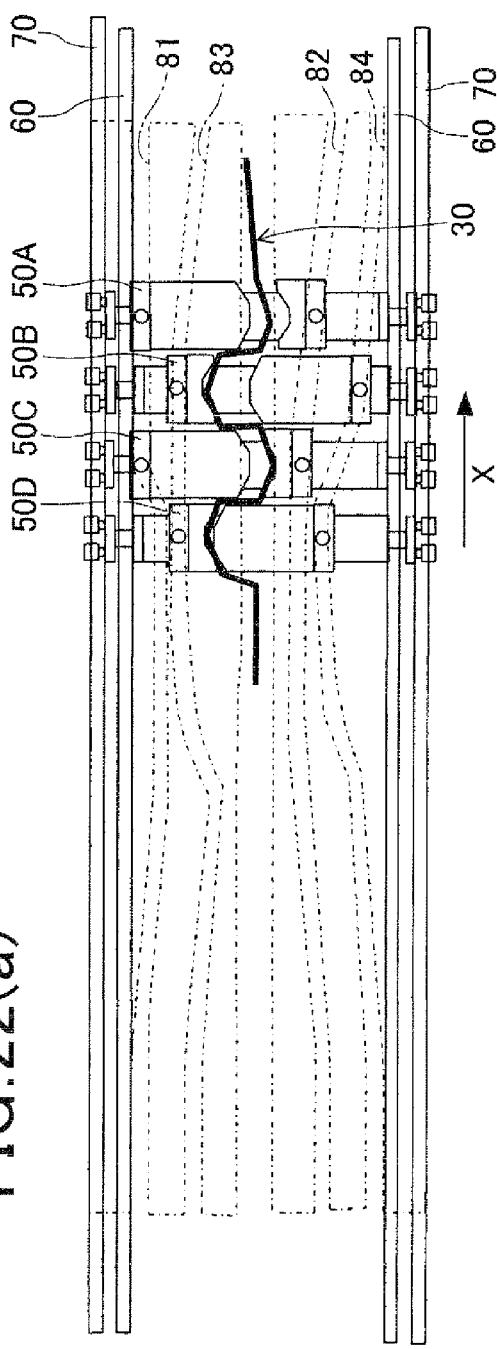

STATOR COIL PRODUCTION METHOD USING SHAPING PRESS PAIRS

CROSS REFERENCE TO RELATED DOCUMENT

The present application claims the benefit of priority of Japanese Patent Application No. 2010-111378 filed on May 13, 2010, the disclosure of which is incorporated herein by reference.

BACKGROUND OF THE INVENTION

1. Technical Field

The present invention relates generally to a production method of a stator coil for use in an electric motor to be mounted in, for example, automotive vehicles, and a production machine for a stator coil.

2. Background Art

Japanese Patent First Publication No. 2009-194994 (corresponding to US2009/0199393 A1, assigned to the same assignee as that of this application) discloses a stator coil production method which bends an insulator-coated conductor wire several times to form a stator coil conductor which is equipped with in-slot portions to be disposed within slots of a stator core and coil-end portions each of which extends between every adjacent two of the in-slot portions and will be a portion of a coil end when the stator coil conductor is wound through the slots of the stator core. This method is achieved using at least three die-punch pairs which are arrayed at regular intervals along a travel path on which the insulator-coated conductor wire travels. The die and the punch of each pair are opposed to each other across the travel path. Specifically, the die and the punch of one of the die-punch pairs are brought close to each other to clamp and press a portion (as will also be referred to as a preplanned coil end portion below) of the insulator-coated conductor wire to form the coil end portion. Simultaneously, the other die-punch pairs are moved in a direction perpendicular to the travel path to form the in-slot portions leading from the coil-end portion.

The above stator coil production method includes two steps: one is to input the insulator-coated conductor wire between the die and the punch of each die-punch pair prior to the step of forming the coil end portion and the other is to remove or output the insulator-coated conductor wire from the die-punch pairs after the step of forming the in-slot portions. Such inputting and outputting steps consume much time to move the dies and the punches because of the insulator-coated conductor wire is long, thus resulting in an increase in time required to complete the stator coil conductor. Additionally, the handling of the insulator-coated conductor wire is complicated, which leads to decreased productivity thereof.

SUMMARY

It is therefore an object to provide a stator coil production method and a production machine which produce a stator coil within a decreased time and are excellent in productivity of the stator coil.

According to one aspect of an embodiment, there is provided a method of producing a stator coil which is to be wound through slots of a stator core of a stator for use in an electric rotating machine using a plurality of shaping press pairs each of which has press members opposed to each other across a looped travel path along which an insulator-coated conductor wire is to be traveled, a rotary retainer through which the shaping press pairs are retained and arrayed away from each other, a rail cam which defines the travel path, and a cam mechanism which defines movements of the shaping press pairs in a direction substantially perpendicular to a length of the insulator-coated conductor wire traveling along the travel path. The rotary retainer rotates to move the shaping press pairs along the travel path. The method comprising: (a) a coil-end portion shaping step of bringing the press members of each of the shaping press pairs close to each other in sequence to shape portions of the insulator-coated conductor wire into coil-end portions which are to be disposed outside the stator core; and (b) an in-slot portion shaping step of advancing the shaping press pairs on the travel path and also moving selected ones of the shaping press pairs through the cam mechanism in sequence in the direction perpendicular to the length of the insulator-coated conductor wire to shape portions of the insulator-coated conductor wire into in-slot portions each of which leads to one of the coil-end portions and which are to be disposed in the slots of the stator core, thereby producing the insulator-coated conductor wire as the stator coil.

Specifically, the coil-end portion shaping step of shaping the coil-end portions in the insulator-coated conductor wire and the in-slot portion shaping step of shaping the in-slot portions in the insulator-coated conductor wire may be performed in sequence while all the shaping press pairs are being revolved along the travel path. In such a way, the coil-end portions and the in-slot portion are formed alternately seamlessly in the insulator-coated conductor wire, thus resulting in a decreased production time for the stator coil and improvement on the productivity thereof. The use of the cam mechanism facilitates the movement of the shaping press pairs in the coil-end portion shaping step and the in-slot portion shaping step.

In the preferred mode of the embodiment, ones of the shaping press pairs which are undergoing the in-slot portion shaping step are broken down into a first group and a second group. Each of the shaping press pairs of the first group is disposed between every adjacent two of the shaping press pairs of the second group. The shaping press pairs of the first group are moved in the direction perpendicular to the travel path, while the shaping press pairs of the second group are held from moving in the direction perpendicular to the travel path, thereby achieving a press operation on the insulator-coated conductor wire to form the in-slot portions.

The in-slot portion shaping step advances the shaping press pairs on the travel path and simultaneously moves the selected ones of the shaping press pairs the direction perpendicular to the travel path, thereby resulting in a decreased time required to form the in-slot portions.

The cam works to move the shaping press pairs so as to decrease distances between themselves and the center of the rotary retainer decrease gradually during the in-slot portion shaping step, thereby decreasing an interval between adjacent two of the shaping press pairs which are undergoing the in-slot portion shaping step. This causes the two adjacent shaping press pairs to be brought close to each other to press the portion of the insulator-coated conductor wire into the in-slot portion.

The cam mechanism defines a first guide path, a second guide path, a third guide path, and a fourth guide path. The first guide path creates movement of one of the press members of the shaping press pairs located at odd-numbered positions. The second guide path creates movement of the other of the press members of the shaping press pairs located at the odd-numbered positions. The third guide path creates movement of one of the press members of the shaping press pairs located at even-numbered positions. The fourth guide path creates movement of the other of the press members of the shaping press pairs located at the even-numbered positions. In other words, the cam mechanism works to create the movements of the press members of the shaping press pairs located at the even-numbered positions and those of the shaping press pairs located at the odd-numbered positions independently of each other, thus facilitating the ease with which the movements of the shaping press pairs required to form the coil-end portions and the in-slot portions are established.

The method further comprises an input step of inputting the insulator-coated conductor wire to the travel path and an output step of outputting the insulator-coated conductor wire from the shaping press pairs. The output step advances each of the shaping press pairs in contact with the cam mechanism and also moves the press members of each of the shaping press pairs away from each other to release the insulator-coated conductor wire, thereby ensuring the stability in releasing the insulator-coated conductor wire.

According to another aspect of the embodiment, there is provided a stator coil producing apparatus which produces a stator coil which is to be wound through slots of a stator core of a stator for use in an electric rotating machine. The stator coil producing machine comprises: (a) a plurality of shaping press pairs each of which has press members opposed to each other across a looped travel path along which an insulator-coated conductor wire is to be traveled; (b) a rotary retainer which retains the shaping press pairs away from each other, the rotary retainer rotating to move the shaping press pairs along the travel path; (c) a rail cam which defines the travel path; and (d) a cam mechanism which works to control movements of the press members of each of the shaping press pairs in opposite directions perpendicular to the travel path. Specifically, the cam mechanism ensures the efficiency in shaping the insulator-coated conductor wire into the stator coil.

In the preferred mode of the embodiment, the cam mechanism controls the movements of the press members of each of the shaping press pairs in synchronization with rotation of the rotary retainer to shape portions of the insulator-coated conductor wire into coil-end portions which are to be disposed outside the stator core and also shape portions of the insulator-coated conductor wire into in-slot portions each of which leads to one of the coil-end portions and which are to be disposed in the slots of the stator core, thereby producing the insulator-coated conductor wire as the stator coil.

Ones of the shaping press pairs which are shaping the in-slot portions are broken down into a first group and a second group, each of the shaping press pairs of the first group being disposed between every adjacent two of the shaping press pairs of the second group. The shaping press pairs of the first group are moved in a direction perpendicular to the travel path, while the shaping press pairs of the second group are held from moving in the direction perpendicular to the travel path.

The rotary retainer advances the shaping press pairs on the travel path and simultaneously moves the selected ones of the shaping press pairs the direction perpendicular to the travel path along with the cam mechanism.

The rail cam works to move the shaping press pairs so as to decrease distances between themselves and the center of the rotary retainer decrease gradually during shaping of the in-slot portions, thereby decreasing an interval between adjacent two of the shaping press pairs which are shaping the in-slot portions.

The cam mechanism defines a first guide path, a second guide path, a third guide path, and a fourth guide path. The first guide path creates the movement of one of the press members of the shaping press pairs located at odd-numbered positions. The second guide path creates the movement of the other of the press members of the shaping press pairs located at the odd-numbered positions. The third guide path creates the movement of one of the press members of the shaping press pairs located at even-numbered positions. The fourth guide path creates the movement of the other of the press members of the shaping press pairs located at the even-numbered positions.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 14(a) is a development view which illustrates an array of shaping press pairs of the stator coil production machine of FIG. 5 which perform a sequence of steps of shaping a stator coil;

FIG. 14(b) is a plane view which illustrates a rotary retainer installed in the stator coil production machine of FIG. 5;

FIG. 14(c) is a plane view which illustrates a rail cam installed in the stator coil production machine of FIG. 5;

FIG. 15(a) is a development view which illustrates an array of shaping press pairs of the stator coil production machine of FIG. 5 which are positioned immediately before an input step of inputting an insulator-coated flat wire into the stator coil production machine is commenced;

FIG. 15(b) is a plane view which illustrates a rotary retainer installed in the stator coil production machine of FIG. 5 immediately before an input step of inputting an insulator-coated flat wire into the stator coil production machine is commenced;

FIG. 15(c) is a plane view which illustrates a rail cam installed in the stator coil production machine of FIG. 5 immediately before an input step of inputting an insulator-coated flat wire into the stator coil production machine is commenced;

Figure 5:
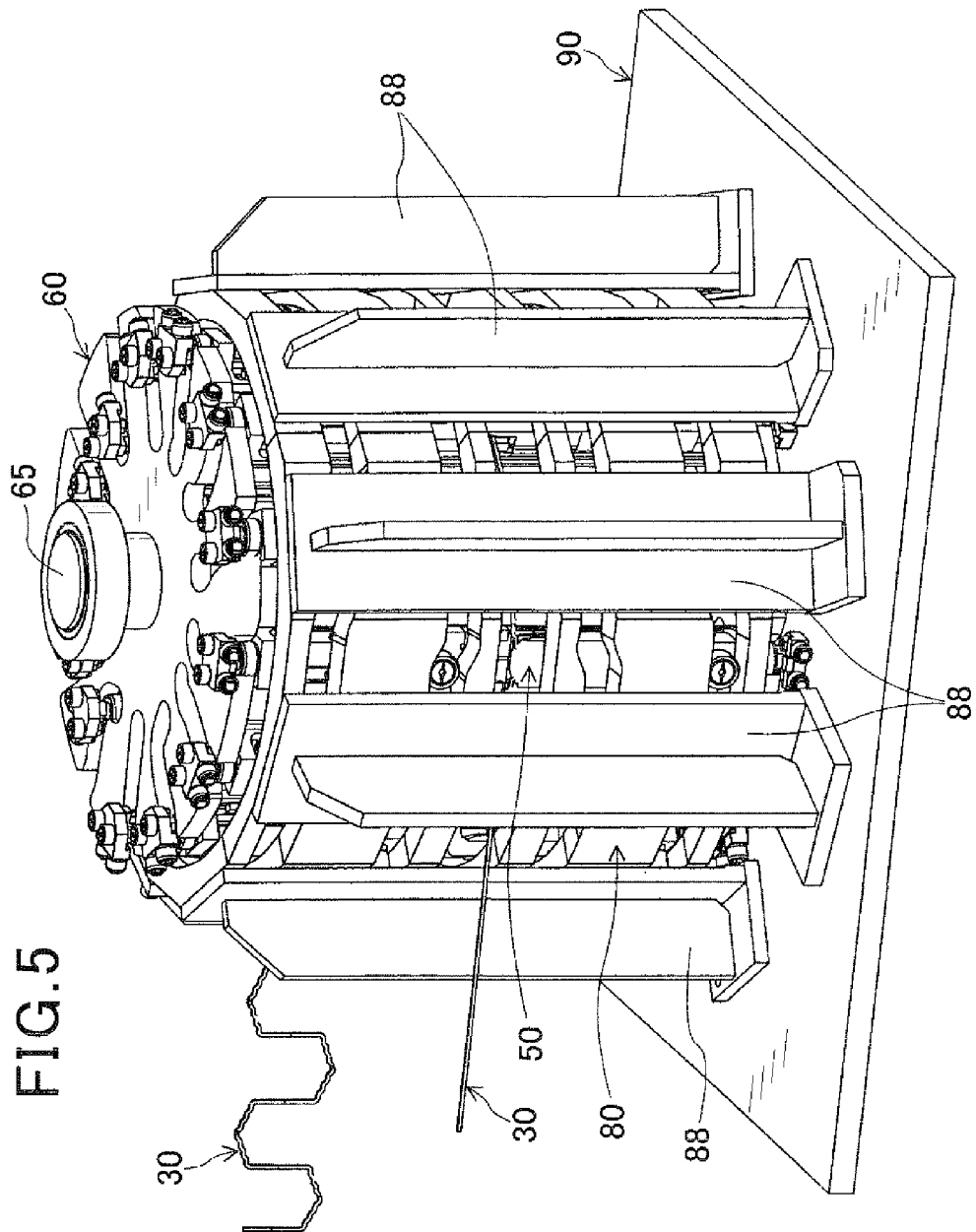
FIG. 5 is a perspective view which illustrates a stator coil production machine according to an embodiment.
Figure 19B:
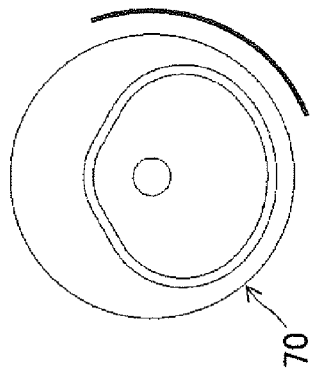
Figure 19C:
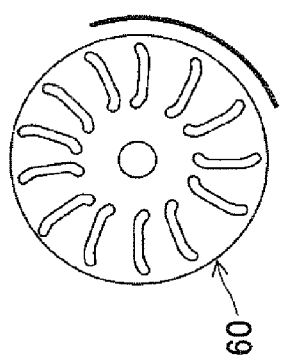
Figure 19A:
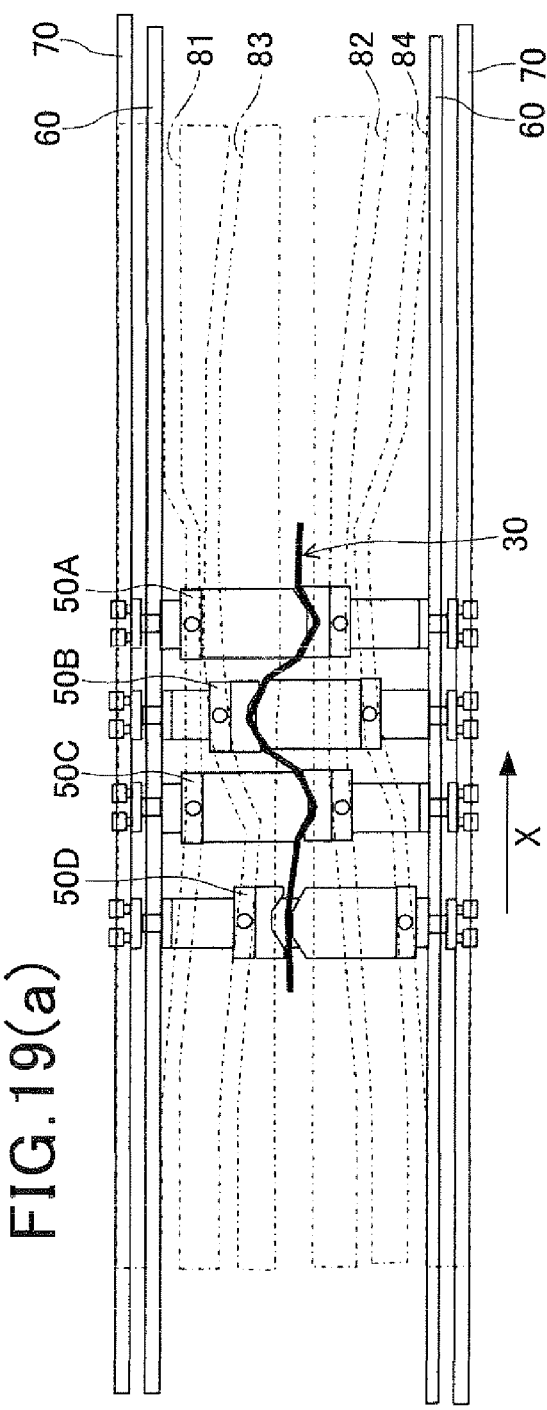

FIG. 16(a) is a development view which illustrates an array of shaping press pairs of the stator coil production machine of FIG. 5 which travel to the position where an input step of inputting an insulator-coated flat wire into the stator coil production machine is commenced;

FIG. 16(b) is a plane view which illustrates a rotary retainer installed in the stator coil production machine of FIG. 5 when an input step of inputting an insulator-coated flat wire into the stator coil production machine is commenced;

FIG. 16(c) is a plane view which illustrates a rail cam installed in the stator coil production machine of FIG. 5 when an input step of inputting an insulator-coated flat wire into the stator coil production machine is commenced;

FIG. 17(a) is a development view which illustrates an array of shaping press pairs of the stator coil production machine of FIG. 5 which are moved to the position where a coil-end portion shaping step is commenced;

FIG. 17(b) is a plane view which illustrates a rotary retainer installed in the stator coil production machine of FIG. 5 when a coil-end portion shaping step is commenced;

FIG. 17(c) is a plane view which illustrates a rail cam installed in the stator coil production machine of FIG. 5 when a coil-end portion shaping step is commenced;

FIG. 18(a) is a development view which illustrates an array of shaping press pairs of the stator coil production machine of FIG. 5 which are moved to the position where an in-slot portion shaping step is commenced;

FIG. 18(b) is a plane view which illustrates a rotary retainer installed in the stator coil production machine of FIG. 5 when an in-slot portion shaping step is commenced;

FIG. 18(c) is a plane view which illustrates a rail cam installed in the stator coil production machine of FIG. 5 when an in-slot portion shaping step is commenced;

FIG. 19(a) is a development view which illustrates an array of shaping press pairs of the stator coil production machine of FIG. 5 which are moved to the position where an in-slot portion shaping step is being executed;

FIG. 19(b) is a plane view which illustrates a rotary retainer installed in the stator coil production machine of FIG. 5 when an in-slot portion shaping step is being executed;

FIG. 19(c) is a plane view which illustrates a rail cam installed in the stator coil production machine of FIG. 5 when an in-slot portion shaping step is being executed;

FIG. 20(a) is a development view which illustrates an array of shaping press pairs of the stator coil production machine of FIG. 5 which are moved to the position where an in-slot portion shaping step is terminated;

FIG. 20(b) is a plane view which illustrates a rotary retainer installed in the stator coil production machine of FIG. 5 when an in-slot portion shaping step is terminated;

FIG. 20(c) is a plane view which illustrates a rail cam installed in the stator coil production machine of FIG. 5 when an in-slot portion shaping step is terminated;

FIG. 21(a) is a development view which illustrates an array of shaping press pairs of the stator coil production machine of FIG. 5 which are moved to the position where an output step of outputting an insulator-coated flat wire is commenced;

FIG. 21(b) is a plane view which illustrates a rotary retainer installed in the stator coil production machine of FIG. 5 when an output step of outputting an insulator-coated flat wire is commenced;

FIG. 21(c) is a plane view which illustrates a rail cam installed in the stator coil production machine of FIG. 5 when an output step of outputting an insulator-coated flat wire is commenced;

FIG. 22(a) is a development view which illustrates an array of shaping press pairs of the stator coil production machine of FIG. 5 which passes through the position where an output step of outputting an insulator-coated flat wire is executed;

FIG. 22(b) is a plane view which illustrates a rotary retainer installed in the stator coil production machine of FIG. 5 when an output step of outputting an insulator-coated flat wire is executed; and FIG. 22(c) is a plane view which illustrates a rail cam installed in the stator coil production machine of FIG. 5 when an output step of outputting an insulator-coated flat wire is executed.

DESCRIPTION OF THE PREFERRED EMBODIMENT

A stator coil production method and a stator coil production machine of an embodiment will be described below which form stepwise coil-end portions in conductor wires (which will also be referred to as coil conductors below) for use in making a stator coil wound through slots of a stator core of an electric rotating machine such as an electric motor, an electric generator, or a motor-generator to be mounted in automotive vehicles.

Figure 1:
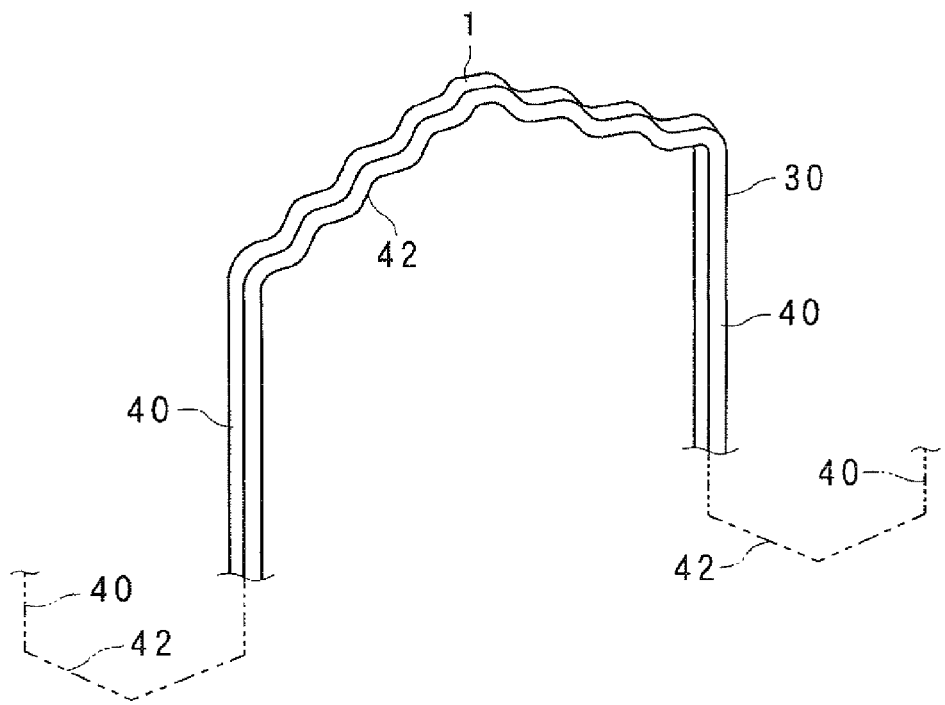
FIG. 1 is a partially perspective view which illustrates an insulator-coated flat wire that is a stator coil to be produced by a stator coil producing method according to an embodiment.
Figure 2:
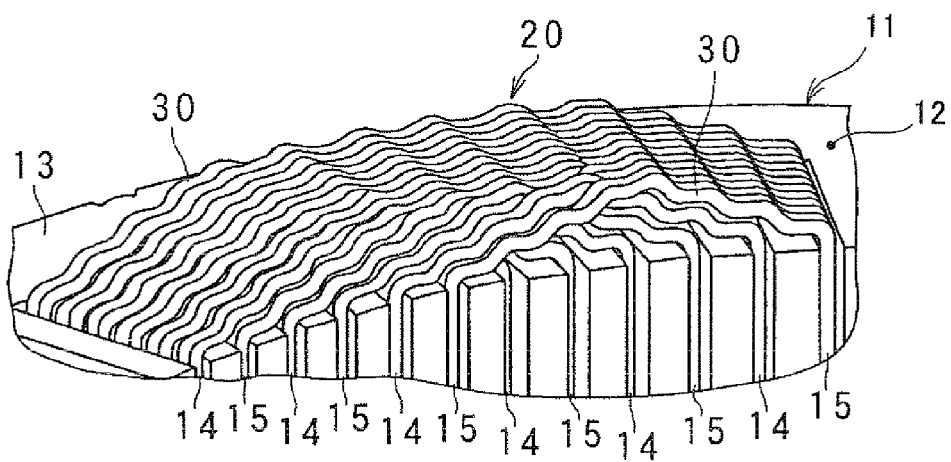
FIG. 2 is a partially perspective view which illustrates a crank-shaped coil end of an assembly of the stator coils of FIG. 1.

The stator coil will first be described below with reference to FIGS. 1 to 4. The stator coil, as referred to herein, is made up of the coil conductors and will also be called a crank-shaped stator coil below. FIG. 1 is a partially perspective view which illustrates an insulator-coated flat wire 30 that is one of the conductor wires making the stator coil. FIG. 2 is a partially perspective view which illustrates a crank-shaped coil end of the stator coil which is formed by an assembly of coil-end portions 42 of the insulator-coated flat wires 30.

The insulator-coated flat wires 30 are wound through slot 14 and 15 formed in a stator core 12 of a stator 11. The stator core 12 is of an annular shape and has an end surface 13 that is one of end surfaces opposed to each other in an axial direction of the stator core 12. The stator 11, as referred to herein, is designed for use in an electric motor-generator to drive an automotive vehicle. The electric motor-generator has a rotor (not shown) disposed to be rotatable within an inner periphery of the stator 11. The rotor has arrayed on an outer circumference thereof a plurality of permanent magnets whose S-poles and N-poles are arrayed alternately in a circumferential direction of the stator core 12. The rotor is opposed at the outer circumference thereof to the inner circumference of the stator 11 through a small air gap. The stator core 12 is made up of a stack of flat rolled magnetic steel sheets each having a given thickness. The stator coil 20 is formed by three-phase windings. Each of the three-phase windings includes two wave-windings. One of the wave-windings of each of the three-phase windings is wound through the slots 14, while the other wave-winding is wound through the slots 15. In other words, the stator coil 20 is of a so-called two-slot per pole per phase type in which each of the three-phase windings is wound through every adjacent two of the slots 14 and 15.

The three phase windings are, for example, distributed wave windings and star-connected to form the stator coil 20. Each of the three phase windings is made by bending the insulator-coated flat wire 30 and then setting it within the slots 14 or 15 of the stator core 12. The stator core 12 is of an open-slot structure, but may alternatively be made of an assembly of blocks.

The insulator-coated flat wire 30 is made by coating copper wire having a rectangular transverse cross section with enamel such as polyamide-imide and also covering it with an extruded resinous layer made of, for example, polyphenylene sulfide (PPS). The insulator-coated flat wire 30 is, therefore, covered with two types of insulating layers. A total thickness of the insulating layers is 100 µm to 170 µm. The insulator-coated flat wire 30 may alternatively have another known type of insulator-coated structure. The insulator-coated flat wires 30 are arrayed in line within each of the slots 14 and 15 in a depthwise direction thereof, but may alternatively be arranged in an array of rows and columns within each of the slots 14 and 15. Typically, an insulating sheet is disposed on an inner periphery of each of the slots of the stator core, but omitted in this embodiment because each of the insulator-coated flat wires 30 is covered with the two insulating layers. Each of the insulator-coated flat wires 30 which makes the stator coil 20 includes, as illustrated in FIG. 1, in-slot portions 40 to be disposed inside the slots 14 or 15 and coil-end portions 42 each of which extends between adjacent two of the in-slot portions 42. When the insulator-coated flat wires 30 are set in the stator core 12, each of the coil-end portions extends over either of the opposed end surfaces of the stator core 12 and connects ends of two of the in-slot portions 42 which lie at an interval of a one-pole pitch away from each other in the circumferential direction of the stator core 12.

Each of the coil-end portions 42 of the insulator-coated flat wire 30 will also be described in detail with reference to FIG. 3.

Figure 3:
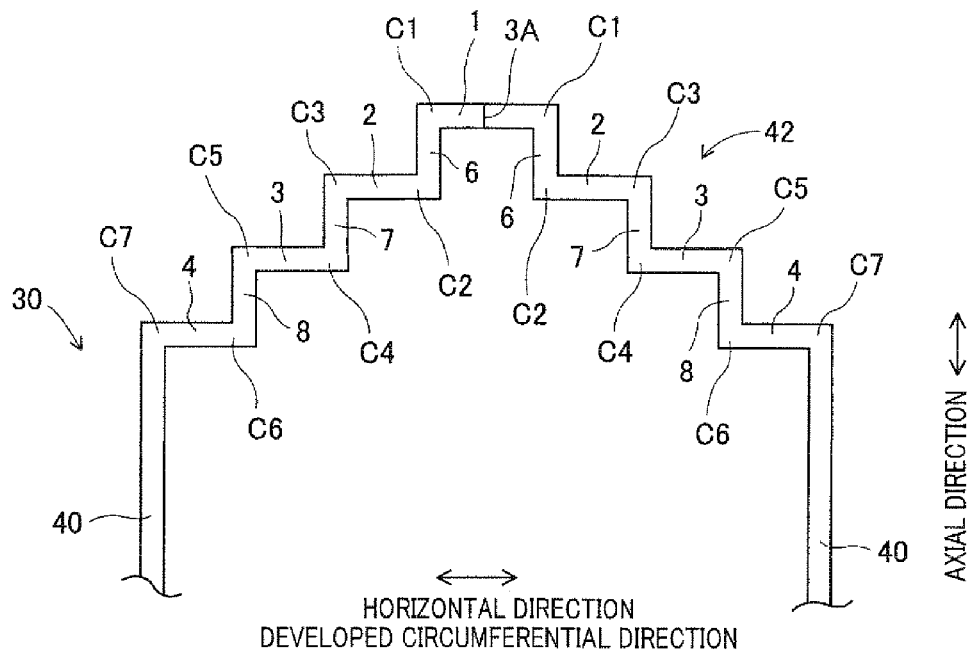
FIG. 3 is a side view which illustrates one of U-shaped sections of the insulator-coated flat wire of FIG. 1.

FIG. 3 illustrates one of U-shaped sections of each of the insulator-coated flat wires 30. The U-shaped section includes a head (i.e., the coil-end portion 42) and two legs (i.e., the in-slot portions 40) extending from ends of the head. The coil-end portion 42 (i.e., the head) has a central top (i.e., the vertex) 1 which lies most outward thereof and extends horizontally (i.e., the circumferential direction of the stator core 12 when the insulator-coated flat wire 30 is set in the stator core 12). The top 1 lies at the center between the two adjacent in-slot portions 40. The coil-end portion 42 is shaped stepwise symmetrically with respect to the top 1. The top 1 has a transverse section 3A formed in the center thereof. The transverse section 3A extends in a thickness-wise direction of the insulator-coated flat wire 30 (i.e., in the radial direction of the stator core 12) by approximately the thickness of the insulator-coated flat wire 30. The transverse section 3A serves to offset one of halves of a length of the coil-end portion 42 from the other in a direction traversing the length of the coil-end portion 42, thereby permitting the coil-end portion 42 to which the transverse section 3A belongs to be laid to overlap an adjacent one of the coil-end portions 42 when the insulator-coated flat wires 30 are wound through the slots 14 and 15 of the stator core 12. The coil-end portion 42 also includes horizontal sections 2, 3, and 4 and vertical sections 6, 7, and 8. The horizontal sections 2 to 4 extend in the lengthwise direction of the insulator-coated flat wire 30, in other words, in the circumferential direction of the stator core 12 and will also be referred to as circumferential sections below. The vertical sections 6 to 8 extend in the transverse direction of the insulator-coated flat wire 30, in other words, in the axial direction of the stator core 12 and will also be referred to as axial sections below. The coil-end portion 42 also includes corners C1, C2, C3, C4, C5, C6, and C7. Each of the corners C1 to C6 lies between one of the top 1 and the circumferential sections 2 to 4 and an adjacent one of the axial sections 6 to 8.

Figure 4:
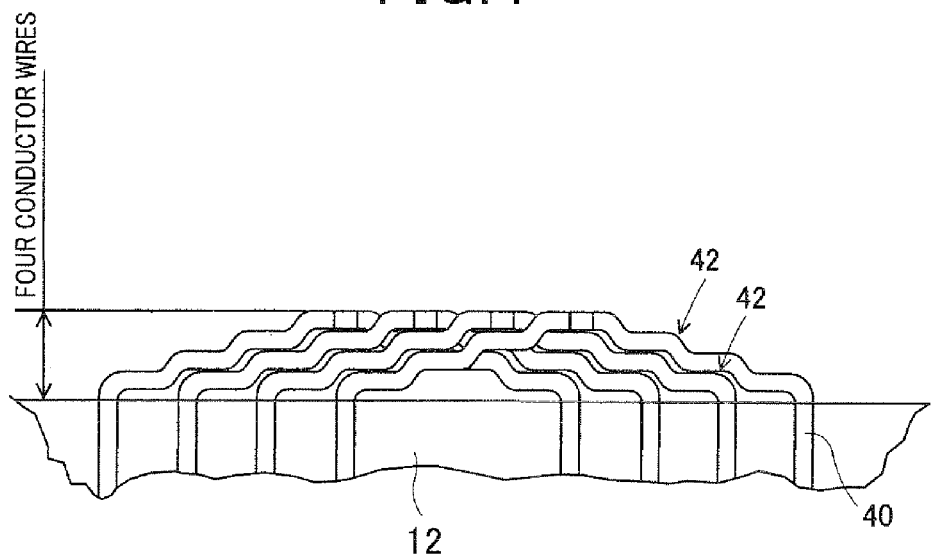
FIG. 4 is a partially side view of FIG. 2.

Each of the corners C7 lies between one of the circumferential sections C7 and a corresponding one of the in-slot portions 40. The coil-end portion 42 is, as described above, shaped stepwise symmetrically with respect to the top 1 (i.e., the transverse section 3A). The corners C1 to C7 are illustrated in FIG. 3 as being right-angled corners, but may alternatively be bent or rounded at a radius of curvature selected from a range which permits the coil-end portions 42 to be arranged close to each other over the end surface of the stator core 12. FIG. 4 illustrates the crank-shaped coil end formed by an assembly of the coil-end portions 42.

The elongated insulator-coated flat wire 30 is, as will be described later in detail, bent several times to form the coil-end portions 42 lying away from each other at regular intervals in the lengthwise direction of the insulator-coated flat wire 30, thereby forming one of the wave-wound phase windings. The phase windings are so assembled as to place the coil-end portions 42 close to each other to make the stator coil which exhibits a belt-shape when developed in the circumferential direction of the stator core 12. The stator coil 20 is inserted at the in-slot portions 40 into the slots 14 and 15 of the stator core 12 to complete the stator 11.

The stator coil 20 is, as described above, so shaped as to have the crank-shaped coil ends and minimize the length of portions (i.e., the crank-shaped coil ends) protruding from either one of the opposed end surfaces of the stator core 12. The crank-shaped coil ends are, therefore, very difficult to produce. This problem may be alleviated by bending the coil conductor (i.e., the insulator-coated flat wire 30) to form the coil-end portions 42 and assembling the coil-end portions 42 before the coil conductor is wound through the stator core 12.

Specifically, the stator 11 is produced by three steps: (1) a coil conductor bending step of bending each of the insulator-coated flat wires 30 to make the in-slot portions 40 and the coil-end portions 42 alternately, (2) a circumferentially-developed stator coil making step of assembling the insulator-coated flat wires 30 so as to lay the coil-end portions 42 to overlap each other in the transverse direction of the insulator-coated flat wires 30 to make the stator coil 20, as developed in the circumferential direction of the stator core 12, and (3) a slot insertion step of inserting the in-slot portions 40 into the slots 14 and 15 of the stator core 12 to complete the stator 11. The feature of the stator coil production method of the embodiment resides on the improvement in the coil conductor bending step.

The stator coil production method and the stator coil production machine of the embodiment will be described below in detail with reference to FIGS. 5 to 13.

Figure 6:
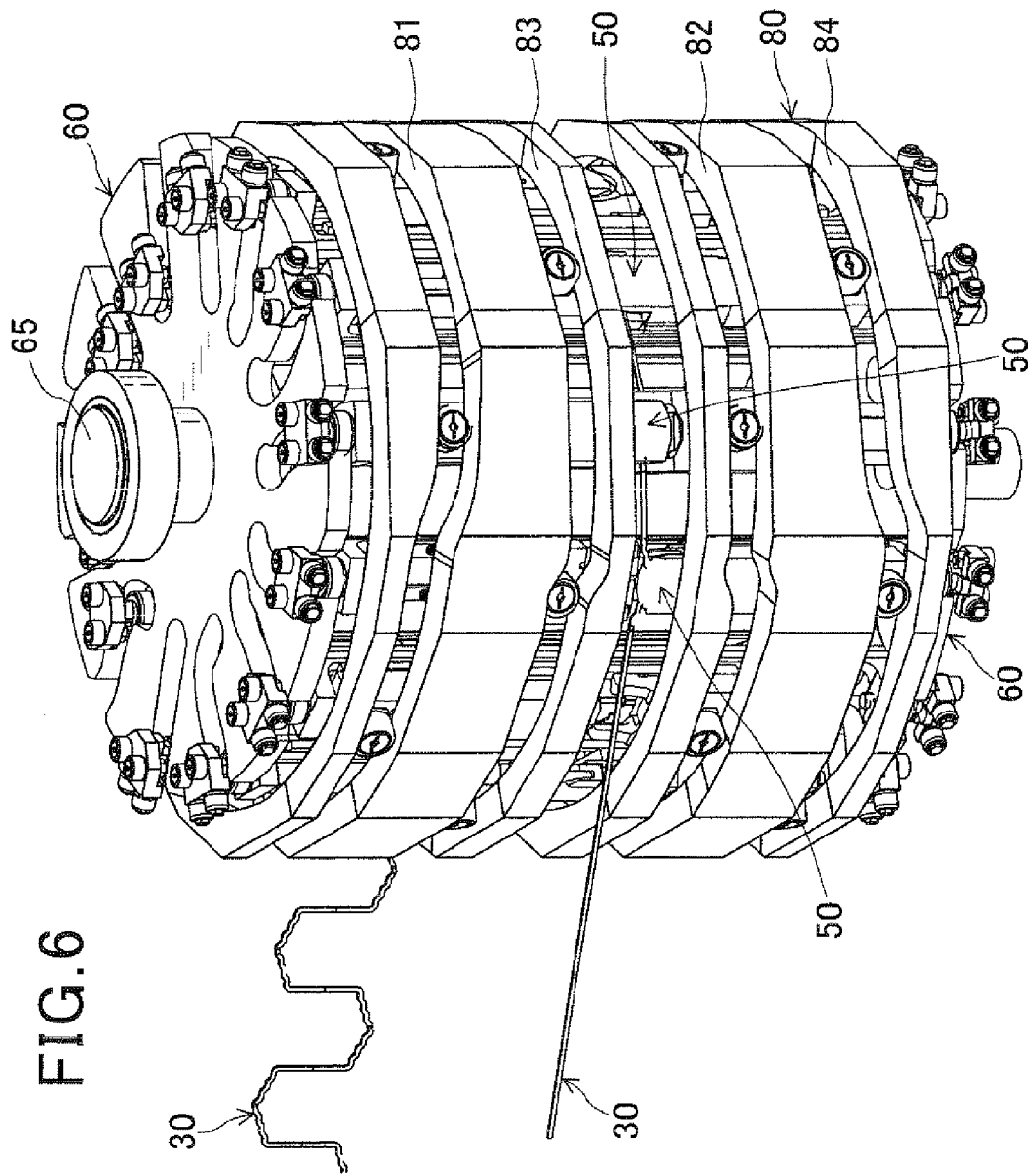
FIG. 6 is a perspective view which illustrates an internal structure of the stator coil production machine of FIG. 5.
Figure 7:
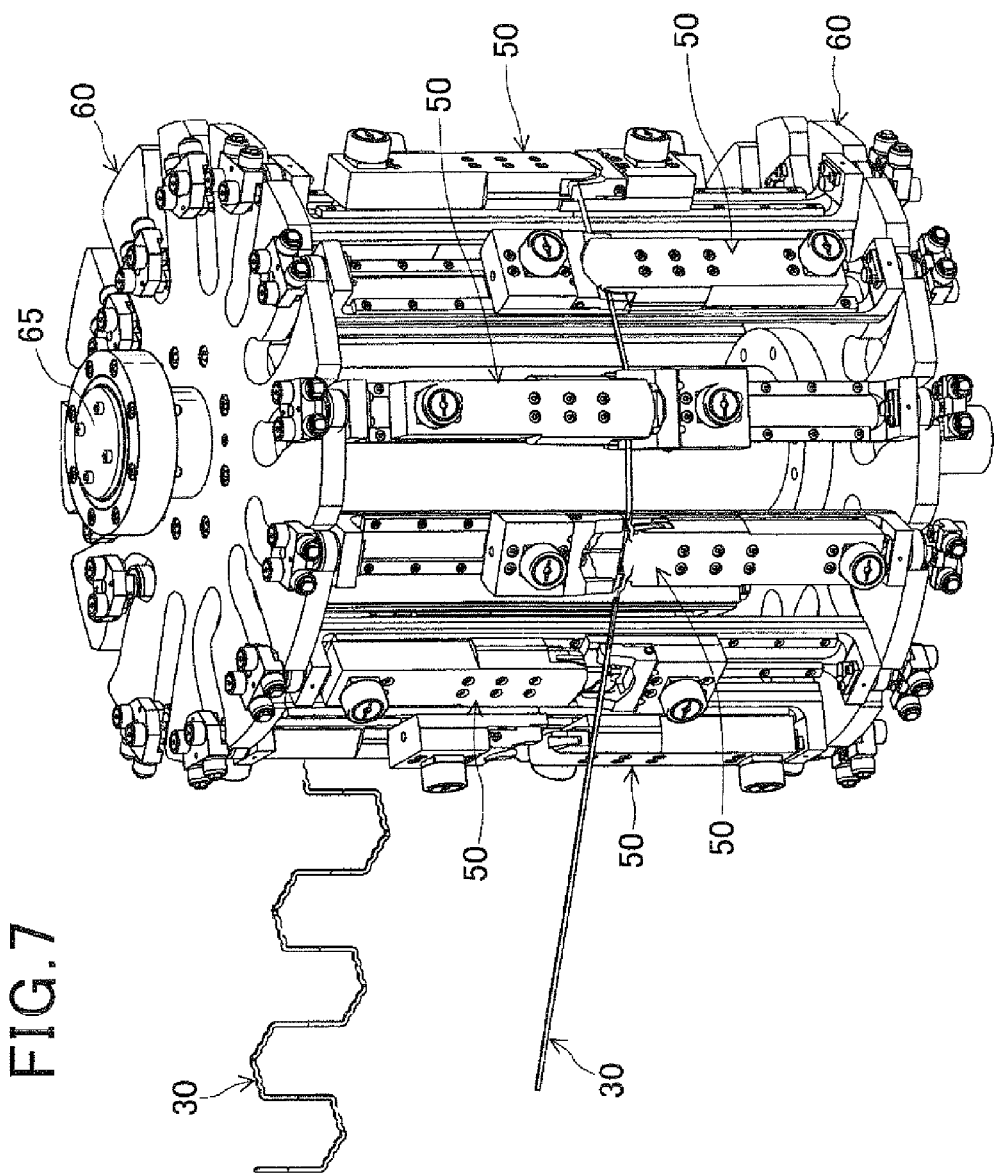
FIG. 7 is a perspective view which illustrates an internal structure of the stator coil production machine of FIG. 5.
Figure 11:
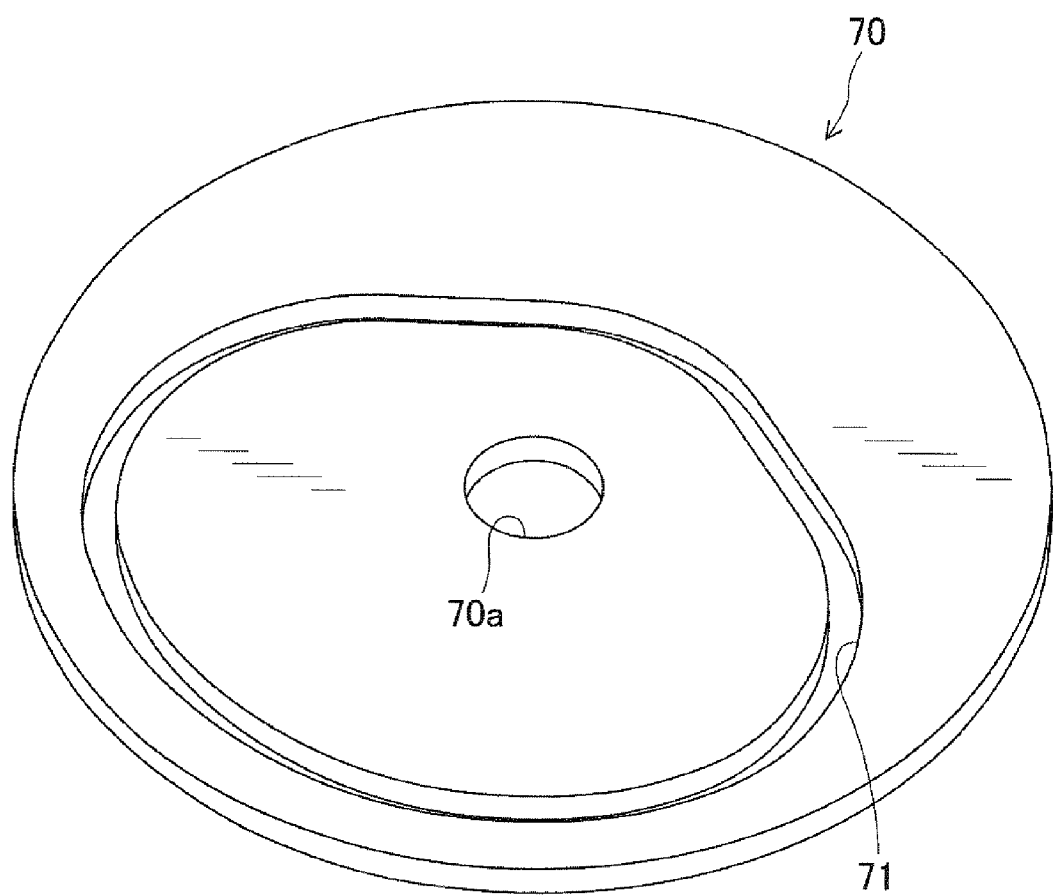
FIG. 11 is a perspective view which illustrates a rail cam installed in the stator coil production machine of FIG. 5.
Figure 12:
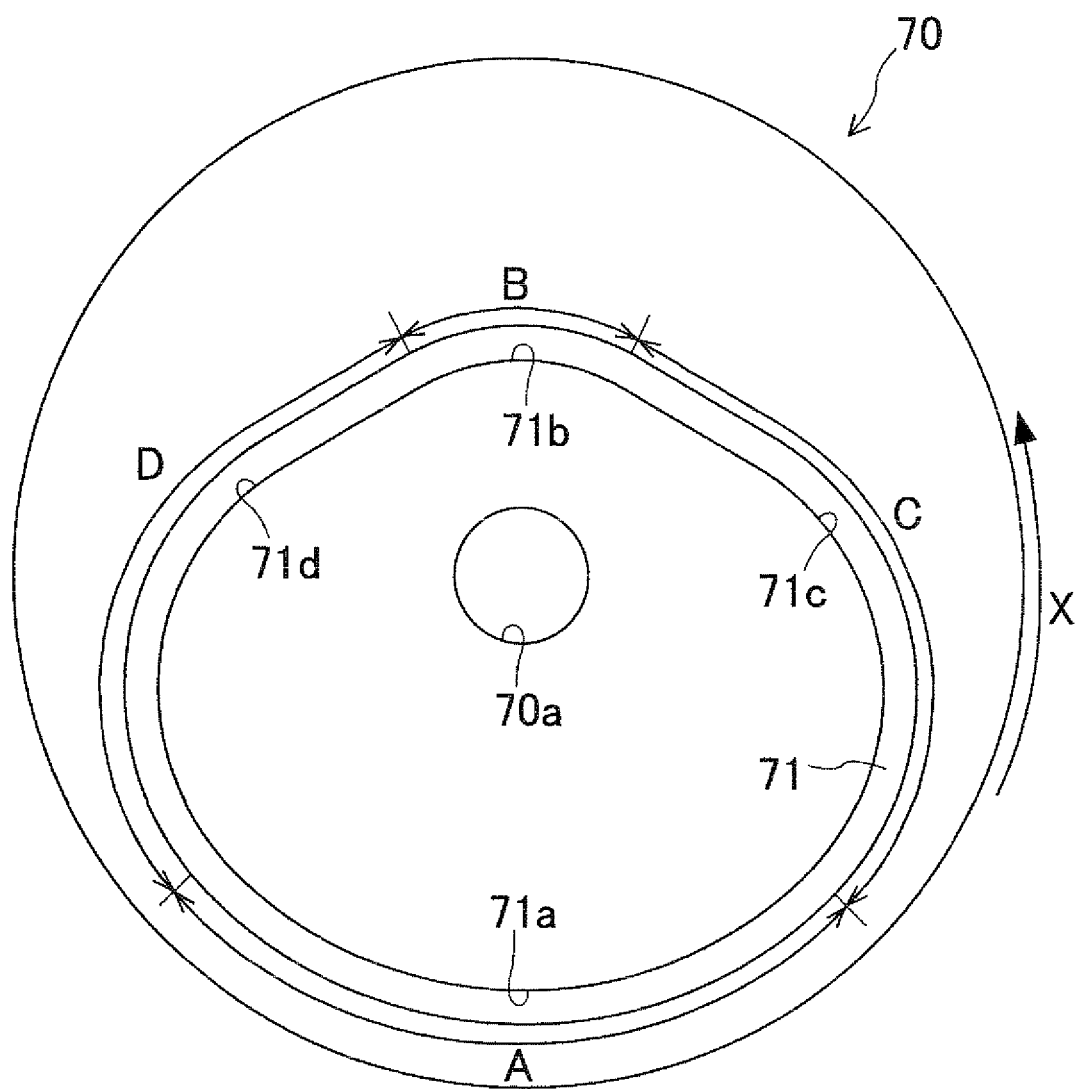
FIG. 12 is a plane view of FIG. 11.
Figure 13:
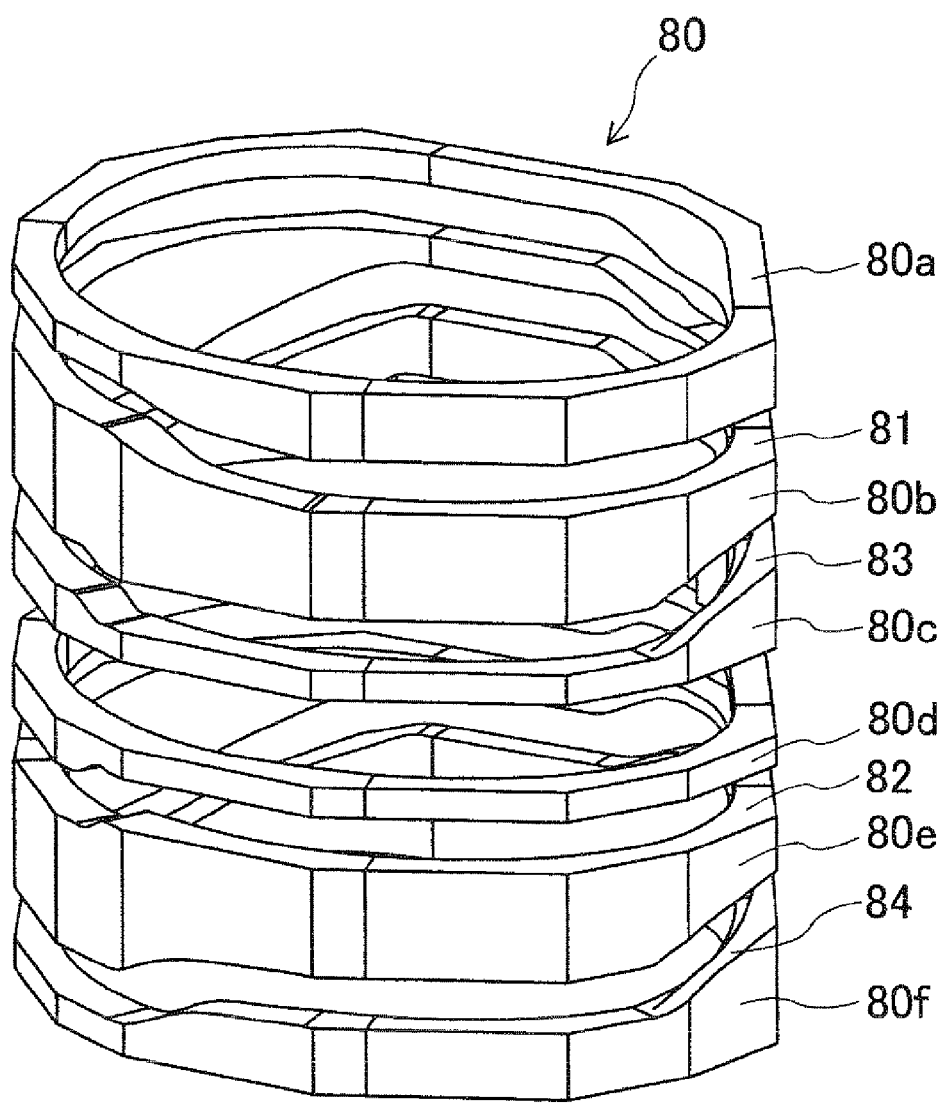
FIG. 13 is a perspective view which illustrates a cam mechanism installed in the stator coil production machine of FIG. 5.

FIGS. 5, 6 and 7 are perspective views which illustrate a structure of the stator coil production machine designed to make the stator coil 20. The stator coil production machine is of a cylindrical-surface circulation vertical type and consists of a plurality of shaping press pairs 50, two rotary retainers 60 which retain the shaping press pairs 50 and rotate them around the center of the stator coil production machine, two rail cams 70, as illustrated in FIGS. 11 and 12, which define paths of travel of the shaping press pairs 50, and a cam mechanism 80 disposed around arrays of the shaping press pairs 50.

Figure 9:
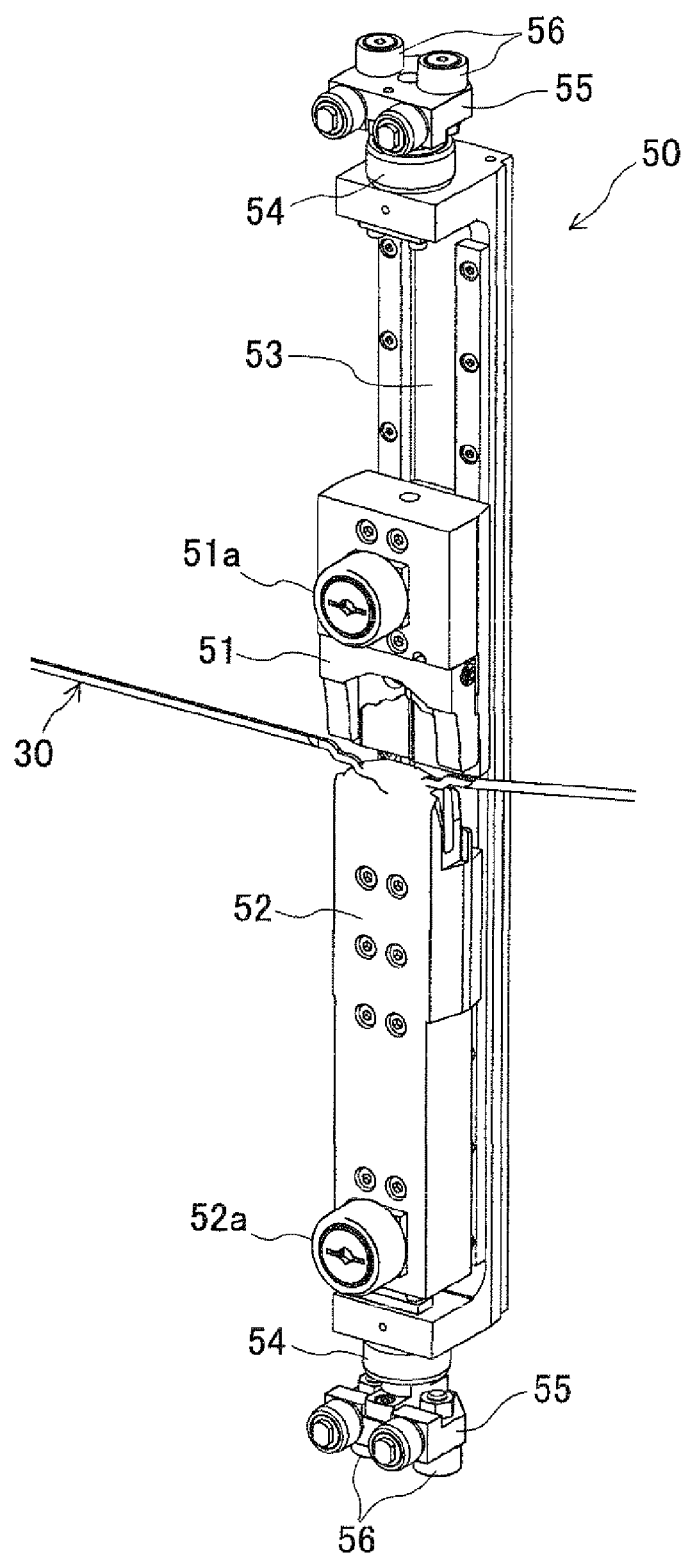
FIG. 9 is an enlarged perspective view which illustrates one of the shaping press pairs of FIG. 8.

Each of the shaping press pairs 50, as clearly illustrated in FIG. 9, consists of a die 51 and a punch 52 which are aligned with each other and work to create a nip through which the insulator-coated flat wire 30 passes. The die 51 and the punch 52 are mounted on an elongated base 53 to be slidable close to or away from each other. The die 51 and the punch 52 have surfaces facing each other which are contoured to conform with the shape of the stepwise coil-end portion 42. The die 51 and the punch 52 have cam followers 51a and 52a secured to surfaces thereof farther away from the mount base 53. The cam followers 51a and 52a are each nipped between two of the first to fourth annular guide paths 81 to 84 of the cam mechanism 80.

Figure 10:
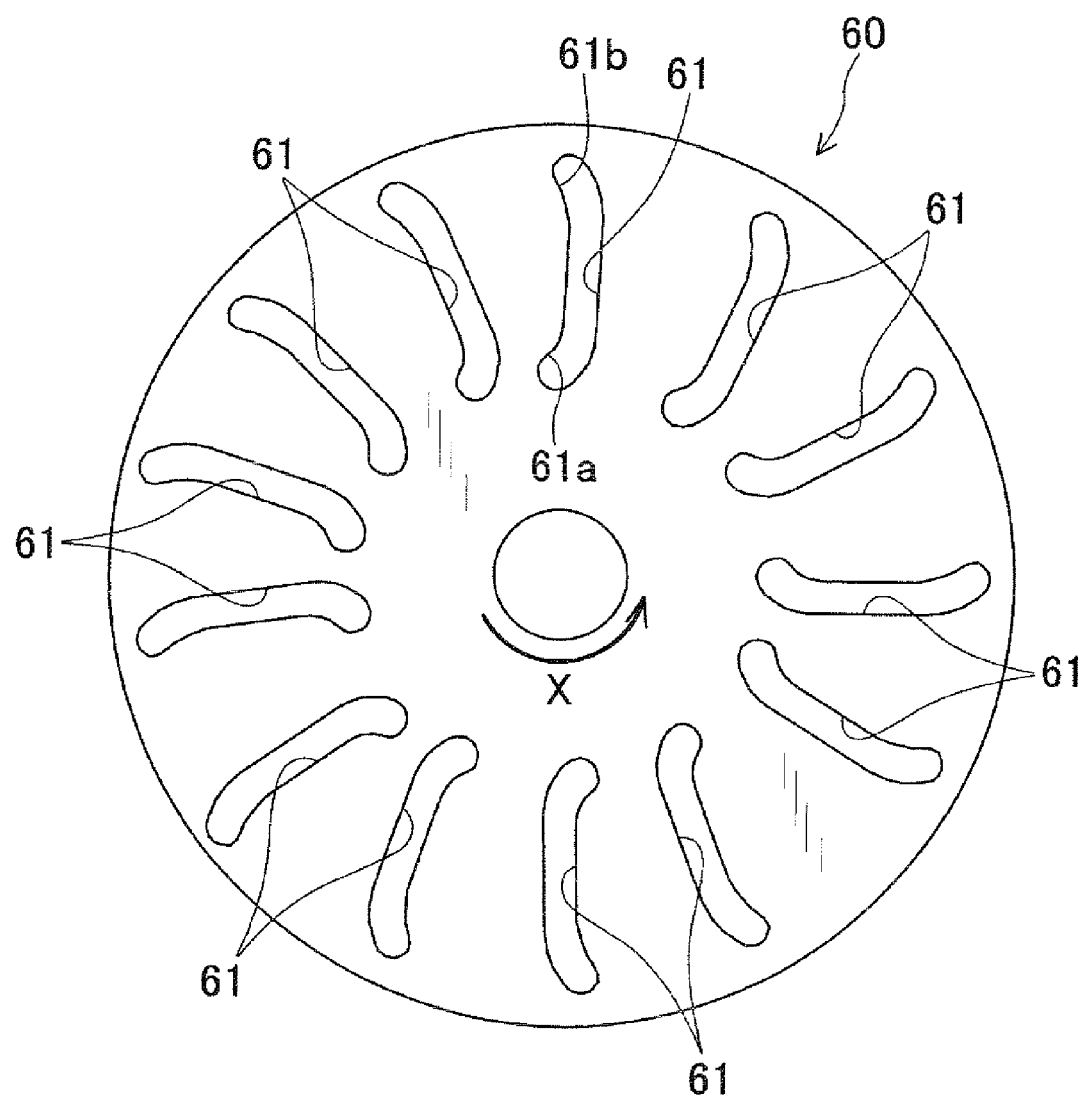
FIG. 10 is a plane view which illustrates a rotary retainer installed in the stator coil production machine of FIG. 5.

The mount base 53 also has shafts which extend from opposed ends thereof in a lengthwise direction and on which rollers 54 are mounted to be rotatable within retaining holes 61 of the rotary retainers 60 illustrated in FIG. 10. The mount base 53 also has support blocks 55 disposed on ends of the shafts. The support blocks 55 have the width greater than that of the retaining holes 61. Each of the support blocks 55 has mounted thereon cam followers 56 which are to be disposed within a race 71 of one of rail cams 70, as illustrated in FIG. 11.

Figure 8:
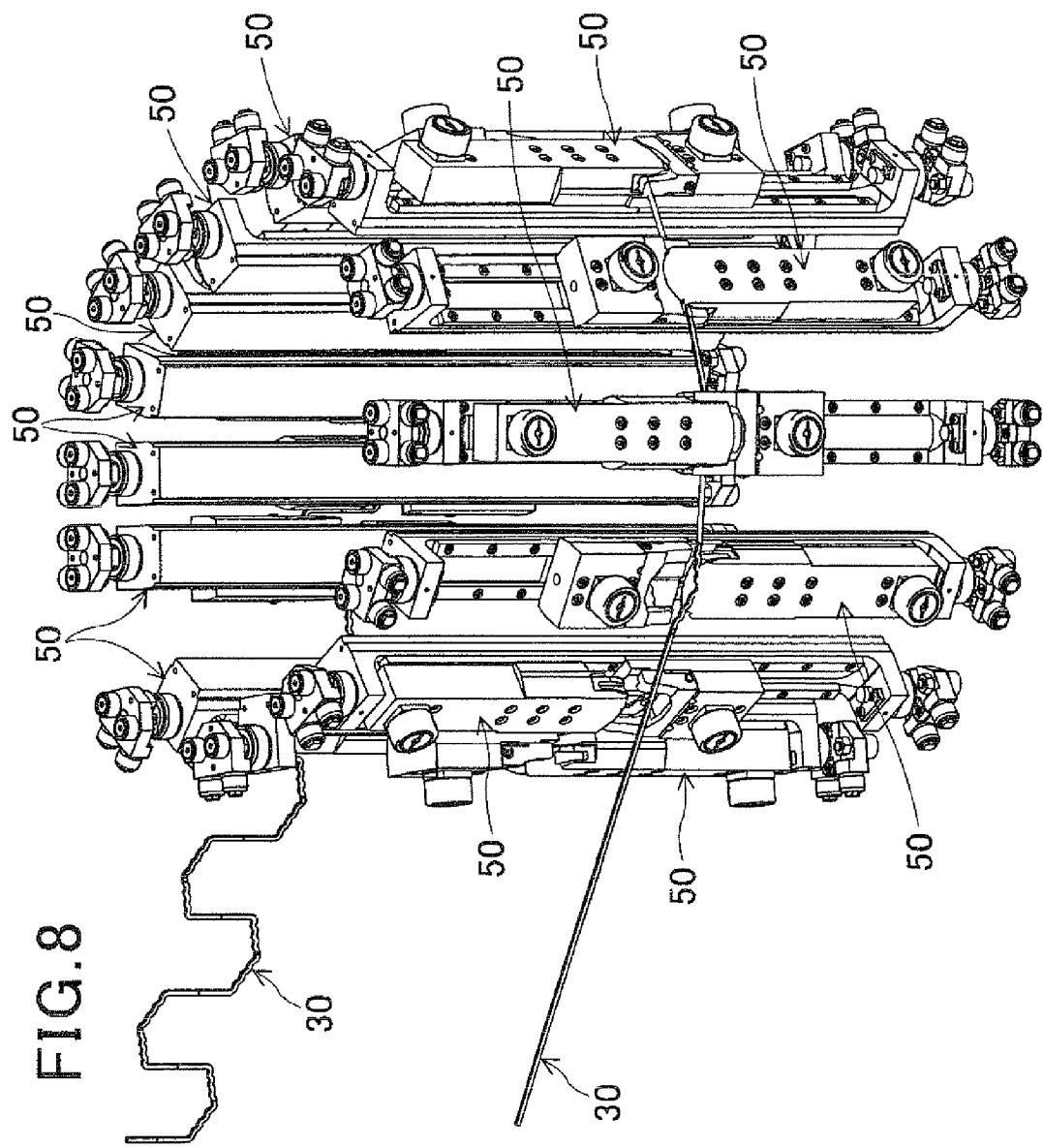
FIG. 8 is a perspective view which illustrates an array of shaping press pairs installed in the stator coil production machine of FIG. 5.

The stator coil production machine is, as illustrated in FIG. 8, equipped with the thirteen (13) shaping press pairs 50 which are arranged at regular intervals in a circular array in parallel to each other. Each of the shaping press pairs 50, as described above, consists of two press members (i.e., the die 51 and the punch 52) and works as press mechanism. The die 51 and the punch 52 face each other in a vertical direction to be movable to form a nip through which the insulator-coated flat wire 30 passes. A leading one of the shaping press pairs 50 into which the insulator-coated flat wire 30 is first inputted has the die 51 disposed below the punch 52. Similarly, each of the shaping press pairs 50 disposed at an odd-numbered position following the leading one has the die 51 disposed below the punch 52. Each of the shaping press pairs 50 disposed at an even-numbered position has the die 51 disposed above the punch 52. In other words, the shaping press pairs 50 are broken down into two types: a first type having the die 51 disposed below the punch 52 and a second type having the die 51 disposed above the punch 52. The first and second types are arranged alternately in the circumferential direction of the stator coil production machine.

The rotary retainers 60 are, as illustrated in FIG. 5, made of disc plates secured to opposed ends of a rotating shaft 65, respectively. Each of the rotary retainers 60, as clearly illustrated in FIG. 10, has the thirteen (13) retaining holes 61 through which the shaping press pairs 50 are retained. Each of the retaining holes 61 is defined by an opening which is cut in the rotary retainer 60 and extends from an outer edge toward the center of the rotary retainer 60. Each of the retaining holes 61 has a first curved end 61a and a second curved end 61b. The first curved end 61a is closer to the center of the rotary retainer 60 than the second curved end 61b and oriented to a direction X of rotation of the rotary retainer 60 (i.e., the shaping press pairs 50). The second curved end 61b is also oriented to the direction X. The length of and the angle which each of the first and second curved ends 61a and 61b of each of the retaining holes 61 makes with a major portion thereof (i.e., the radial direction of the rotary retainer 60) are determined in a given relation to those of a preceding one of the retaining holes 61 in the direction X.

The two rollers 54 installed on the ends of each of the mount bases 53 are, as can be seen from FIG. 6, disposed in a corresponding one of the retaining holes 61 of the upper rotary retainer 60 and a corresponding one of the retaining holes 61 of the lower rotary retainer 60, respectively, so that all the shaping press pairs 50 are held in the circular array by the rotary retainers 60 through the support blocks 55. Each of the shaping press pairs 50 is also movable radially of the rotary retainers 60 along a path, defined by corresponding two of the retaining holes 61 of the rotary retainers 60.

The rail cams 70 are each made of a disc plate which is substantially identical in size with the rotary retainers 60. Each of the rail cams 70 is disposed outward of one of the rotary retainers 60 in the axial direction of the stator coil production machine in mechanical connection therewith through a coupling mechanism (not shown). The rail cams 70, as illustrated in FIGS. 11 and 12, have the annular races 71 formed by grooves cut in major surfaces facing each other in the axial direction of the stator coil production machine. The annular races 71 serve as rails along which the shaping press pairs 50 supported by the rotary retainers 60 are to travel, that is, define the path of travel of the shaping press pairs 50. In the annular races 71, the cam followers 56 on the ends of the mount bases 50 are fit, so that the shaping press pairs 50 may be advanced by the rotary retainers 60 in the direction X along the annular races 71.

Each of the races 71 has an irregularly shaped profile and is made up of a greater circular section 71a, a smaller circular section 71b, a great radius-of-curvature varying section 71c, and a small radius-of-curvature varying section 71d. The greater circular section 71a extends along an outer edge (i.e., a circumference) of the rail cam 70 and is identical in radius of curvature with the outer edge of the rail cam 70. The smaller circular section 71b extends along an inner edge (i.e., a circumference) of a center hole 70a of the rail cam 70 and is identical in radius of curvature with the center hole 70a. The great radius-of-curvature varying section 71c extends from an end of the greater circular section 71a to an end of the smaller circular section 71b at a variable radius of curvature increasing gradually. The small radius-of-curvature varying section 71d extends from the other end of the smaller circular section 71b to the other end of the greater circular section 71a at a variable radius of curvature decreasing gradually.

The greater circular section 71a defines a first constant-speed path A on which each of the shaping press pairs 50 is to travel in the direction X at a constant speed. The smaller circular section 71b defines a second constant-speed path B on which each of the shaping press pairs 50 is to travel in the direction X at a constant speed lower than that in the greater circular section 71a. The great radius-of-curvature varying section 71c defines a decelerating path C on which each of the shaping press pairs 50 is to travel while decelerating gradually in the direction X. The small radius-of-curvature varying section 71d defines an accelerating path D on which each of the shaping press pairs 50 is to travel while accelerating gradually in the direction X. The stator coil production machine is designed to have an inlet in substantially the center of the greater circular section 71a (i.e., the first constant-speed path A) into which the insulator-coated flat wire 30 is to enter and an outlet in substantially the center of the smaller circular section 71b (i.e., the second constant-speed path B) from which the insulator-coated flat wire 30 is to get out. Specifically, each of the shaping press pairs 50 travels half the race 71 within the time for which the insulator-coated flat wire 30 advances from the inlet to the outlet, thereby achieving the coil conductor bending step which bends the insulator-coated flat wire 30 to make the in-slot portions 40 and the coil-end portions 42 alternately.

The movement of each of the shaping press pairs 50 along the odd-shaped races 71 of the rail cams 70 is achieved by enabling the rollers 54 of a corresponding one of the mount bases 53 to reciprocate in a corresponding one of combinations of the retaining holes 61 which are cut in the upper and lower rotary retainers 60 and extend in the radial direction thereof. The first curved end 61a of each of the retaining holes 61 which is located close to the center of the rotary retainer 60 serves to keep adjacent two of the shaping press pairs 50 placed closest to each other for an increased period of time when the insulator-coated flat wire 70 is discharged from the stator coil production machine, thereby facilitating the ease with which the insulator-coated flat wire 30 is released from the shaping press pairs 50. The second curved end 61b of each of the retaining holes 61 which is located far away from the center of the rotary retainer 60 serves to keep every adjacent two of the shaping press pairs 50 placed closest to each other for an increased period of time when the insulator-coated flat wire 70 is put into the shaping press pairs 50, thereby facilitating the ease with which the insulator-coated flat wire 30 is supplied into the stator coil production machine.

The cam mechanism 80 is, as can be seen from FIG. 6, disposed outside the shaping press pairs 50 and surrounds the circular arrays of the shaping press pairs 50. The cam mechanism 80 is, as clearly illustrated in FIG. 13, of a hollow cylindrical shape and consists of six discrete rings 80a to 80f which will also be referred to as first to sixth rings below. The first to sixth rings 80a to 80f are laid to overlap each other in the axial direction of the cam mechanism 80 and held, as shown in FIG. 5, by a plurality of supports 88 standing on a mount base 90.

Between upwardly located two of the first to sixth rings 80a to 80f, that is, between the first and second rings 80a and 80b, the first guide path 81 is defined in which the cam followers 52a of the punches 52 of the shaping press pairs 50 disposed at the odd-numbered positions are fit. Between the fourth and fifth rings 80d and 80e, the second guide path 82 is defined in which the cam followers 51a of the dies 51 of the shaping press pairs 50 disposed at the odd-numbered positions are fit. Between the second and third rings 80b and 80c, the third guide path 83 is defined in which the cam followers 51a of the dies 51 of the shaping press pairs 50 disposed at the even-numbered positions are fit. Between the fifth and sixth rings 80e and 80f, the fourth guide path 84 is defined in which the cam followers 52a of the punches 52 of the shaping press pairs 50 disposed at the odd-numbered positions are fit.

With the above arrangements of the first to fourth guide paths 81 to 84, the die 51 and the punch 52 of each of the shaping press pairs 50 located at the odd-numbered positions and the die 51 and the punch 52 of each of the shaping press pairs 50 located at the even-numbered positions will be different in motion from each other. Specifically, the first to fourth guide paths 81 to 84 specify relative positions of the die 51 and the punch 52 of each of the shaping press pairs 50 when being revolved by the rotary retainers 60.

The stator coil production method using the above described stator coil production machine will be described below with reference to FIGS. 14(a) to 22(c). FIGS. 14(a) to 14(b) demonstrate all a sequence of steps of bending the coil conductor (i.e., the insulator-coated flat wire 30). FIG. 14(a) is a development diagram which shows the array of the shaping press pairs 50, as developed in the circumferential direction of the stator coil production machine. FIG. 14(b) is a plane view which shows the rotary retainer 60. FIG. 14(c) is a plane view which shows the rail cam 70. Note that FIG. 14(a) schematically represents the shape of the coil-end portions 42 of the insulator-coated flat wire 30 for the sake of simplicity.

Arc-shaped thick lines in FIGS. 14(b) and 14(c) drawn outside the rotary retainer 60 and the rail cam 70 indicate a range within which the shaping press pairs 50, as illustrated in FIG. 14(a), exist. The same is true for the FIGS. 15(a) to 22(c).

FIGS. 15(a) to 22(c) show an input step of inputting the insulator-coated flat wire 30 into the stator coil production machine (i.e., one of the shaping press pairs 50), a coil-end portion shaping step of shaping the coil-end portions 42, an in-slot portion shaping step of shaping the in-slot portions 40, and an output step of outputting the insulator-coated flat wire 30 from the stator coil production machine. FIGS. 15(a) to 22(c) represents only four of the shaping press pairs 50, which will also be expressed by 50A, 50B, 50C, and 50D below, for the sake of simplicity of illustration.

The stator coil production machine is run by an actuator (not shown). Upon turning on of the actuator, the rotating shaft 65 starts to rotate, so that all the shaping press pairs 50 are revolved through the rotary retainers 60 around the rotating shaft 65 at a constant speed. This causes all the shaping press pairs 50 to revolve in the direction X (i.e., the lengthwise direction of the insulator-coated flat wire 30) and advance along the travel path defined by the races 71 of the rail cams 70. The die 51 and the punch 52 of each of the shaping press pairs 50 travel in contact with any of the surfaces of the first to fourth guide paths 81 to 84, so that the die 51 and the punch 52 move close to or away from each other in the vertical direction (i.e., the axial direction of the stator coil production machine).

Input Step

During the revolving of the shaping press pairs 50, some of them traveling along the first constant-speed path A (i.e., the greater circular section 71a) of the races 71, as illustrated in FIGS. 15(a) to 16(c), are in the condition where the die 51 and the punch 52 is placed away from each other in the vertical direction (i.e., the direction in which the die 51 and the punch 52 faces). When one of the shaping press pairs 50 has reached the middle of the greater circular section 71, the insulator-coated flat wire 70 is inputted to the stator coil production machine. In FIGS. 15(a) and 16(a), the four shaping press pairs 50A to 50D are traveling along the first constant-speed path A at constant intervals away from each other. The retaining holes 61 of the rotary retainers 60 through which the shaping press pairs 50A to 50D are retained have, as described above, the second curved ends 61b, thereby causing the adjacent two of the shaping press pairs 50A to 50D to be kept closest to each other for a long time. This ensures the stability in inputting the insulator-coated flat wire 30 into one of the shaping press pairs 50A to 50D.

Coil-End Portion Shaping Step

Subsequently, with the rotation of the rotary retainers 60, the die 51 and the punch 52 of the shaping press pair 50A into which the insulator-coated flat wire 30 has been inputted, as illustrated in FIGS. 16(a) to 16(c), move close to each other. When the shaping press pair 50A has reached the position, as illustrated in FIGS. 17(a) to 17(c), a leading portion of the insulator-coated flat wire 30 is clamped and pressed by the die 51 and the punch 52 of the shaping press pair 50A and then shaped into the stepwise coil-end portion 42 protruding downward, as viewed in FIG. 17(a). Afterwards, the shaping press pair 50A travels while holding the coil-end portion 42 tightly.

Like the shaping press pair 50A, when each of the following shaping press pairs 50B to 50D has reached the position, as illustrated in FIGS. 17(a) to 17(c), a corresponding portion of the insulator-coated flat wire 30 is pressed by the die 51 and the punch 52 and then shaped into the stepwise coil-end portion 42 protruding either in the upward or downward direction, as viewed in FIG. 17(a). Afterwards, each of the shaping press pairs 50B to 50D travels while holding a corresponding one of the coil-end portions 42 tightly as it is. With the shaping press pairs 50A to 50D, the coil-end portions 42 are formed sequentially which protrude upward and downward alternately.

In-Slot Portion Shaping Step

After having formed the coil-end portion 42, the shaping press pair 50A, as illustrated in FIGS. 18(a) to 18(c), transfers from the first constant-speed path A (i.e., the greater circular section 71a of the race 71) to the decelerating path C (i.e., the great radius-of-curvature varying section 71c of the race 71), so that it decelerates gradually. With the gradual deceleration, the interval between adjacent two of the shaping press pairs 50A to 50D is, as illustrated in FIGS. 19(a) to 19(c), decreased. This causes the shaping press pairs 50A to 50D to approach each other sequentially. The shaping press pairs 50A and 50C located at the odd-numbered positions travel straight in the horizontal direction along the first and second guide paths 81 and 82 without moving vertically. The shaping press pairs 50B and 50D located at the even-numbered positions enter or advance to the decelerating path C (i.e., the great radius-of-curvature varying section 71c of the race 71). Upon entering the decelerating path C, each of the shaping press pairs 50B and 50D decelerates gradually and moves upward along the third and fourth guide paths 83 and 84.

The above movements of the shaping press pairs 50A and 50B cause both a trailing end of the coil-end portion 42 which is held by the shaping press pair 50A and located close to the shaping press pair 50B and a leading end of the coil-end portion 42 which is held by the shaping press pair 50B and located close to the shaping press pair 50A to be bent. When the shaping press pair 50A, as illustrated in FIGS. 20(a) to 20(c), has reached the end of the decelerating path C (i.e., the great radius-of-curvature varying section 71c), the shaping press pairs A and B are placed closest to each other. This causes a portion of the insulator-coated flat wire 30 between the coil-end portions 42 held by the shaping press pairs 50A and 50B to be shaped into the in-slot portion 40 which extends perpendicular to the coil-end portions 42.

With the rotation of the rotary retainers 60, the in-slot portions 42 are formed sequentially between the shaping press pairs 50B and 50C and between the shaping press pairs 50C and 50D.

Output Step

After completion of the in-slot portion shaping step, the shaping press pair 50A, as illustrated in FIGS. 21(a) to 21(c), transfers from the decelerating path C to the second constant-speed path B (i.e., the smaller circular section 71b of the race 71) and then travels at the speed lower than that in the first constant-speed path A (i.e., the greater circular section 71a. When the shaping press pair 50A enters the second constant-speed path B, the punch 52 moves upward along the first guide path 81. After a slight delay from the upward movement of the punch 52, the die 51 moves downward along the second guide path 82 while revolving in the direction X. This causes the coil-end portion 42 to be released from the shaping press pair 50A. When entering the second constant-speed path B, the shaping press pairs 50 disposed at the odd-numbered positions move in the same manner as the shaping press pair 50A.

When the shaping press pair 50B following the shaping press pair 50A, as illustrated in FIGS. 22(a) to 22(c), enters the second constant-speed path B, the punch 52 moves downward along the fourth guide path 84 while revolving in the direction X. After a slight delay from the downward movement of the punch 52, the die 51 moves upward along the third guide path 83. This causes the coil-end portion 42 to be released from the shaping press pair 50B. When entering the second constant-speed path B, the shaping press pairs 50 disposed at the even-numbered positions move in the same manner as the shaping press pair 50B.

In the manner, as described above, when each of the shaping press pairs 50A to 50D reaches the middle of the smaller circular section 71b, the insulator-coated flat wire 30 is outputted from between the die 51 and the punch 42.

When the shaping press pairs 50A to 50D are traveling on the second constant-speed path B (i.e., the smaller circular section 71b of the race 71), the interval between adjacent two thereof is kept constant. The retaining holes 61 of the rotary retainers 60, as described above, have the first curved ends 61a, thereby causing the adjacent two of the shaping press pairs 50A to 50D to be kept closest to each other for a long time. This ensures the stability in releasing the insulator-coated flat wire 30 from the shaping press pairs 50A to 50D.

After completion of the output step, the insulator-coated flat wire 30 will be the coil conductor which has the coil-end portions 42 and the in-slot portions 40 formed alternately in the lengthwise direction thereof.

The stator coil producing method, as described above, offers the following advantages.

The coil-end portion shaping step of shaping the coil-end portions 42 in the insulator-coated flat wire 30 and the in-slot portion shaping step of shaping the in-slot portions 40 in the insulator-coated flat wire 30 are performed in sequence while all the shaping press pairs 50 which are arrayed at given intervals along the travel path in the stator coil production machine on which the insulator-coated flat wire 30 is to travel are being revolved about the axis of the stator coil production machine. In such a way, the coil-end portions 42 and the in-slot portion 40 are formed alternately seamlessly in the insulator-coated flat wire 30, thus resulting in a decreased production time for the coil conductor and improvement on the productivity thereof. Particularly, the use of the cam mechanism 80 facilitates the movement of the shaping press pairs 50 in the coil-end portion shaping step and the in-slot portion shaping step.

The stator coil production machine is, as described above, designed to have the shaping press pairs 50 (i.e., 50B and 50D) which are moved in the vertical direction perpendicular to the length of the insulator-coated flat wire 30 during the in-slot portion shaping step and the shaping press pairs (i.e., 50A and 50C) each of which is not moved in the vertical direction during the in-slot portion shaping step and is disposed between two of the moving shaping press pairs 50, thereby achieving the press operation on the insulator-coated flat wire 30 to form the in-slot portions 40.

The stator coil production machine is also designed to move the shaping press pairs 50 simultaneously in the vertical direction perpendicular to the length of the insulator-coated flat wire 30 and in the lengthwise direction of the insulator-coated flat wire 30 in the in-slot portion shaping step, thus resulting in a decrease in time required to shape the in-slot portion 40 in the insulator-coated flat wire 30.

The stator coil production machine (i.e., the rail cams 70) is further designed to move the shaping press pairs 50 so as to decrease distances between themselves and the center of each of the rotary retainers 60 decrease gradually during the in-slot portion shaping step, in other words, decrease the interval between adjacent two of the shaping press pairs 50 which are undergoing the in-slot portion shaping step as they advance, thereby facilitating the ease of forming the in-slot portions in the insulator-coated flat wire 30.

The cam mechanism 80, as described above, includes the first to sixth rings 80a to 80f which create the first to fourth guide paths 81 to 84. The first guide path 81 defines the path of travel of the punches 52 of the shaping press pairs 50 disposed at the odd-numbered positions. The second guide path 82 defines the path of travel of the dies 51 of the shaping press pairs 50 disposed at the odd-numbered positions. The third guide path 83 defines the path of travel of the dies 51 of the shaping press pairs 50 disposed at the even-numbered positions. The fourth guide path 84 defines the path of travel of the punches 52 of the shaping press pairs 50 disposed at the even-numbered positions. In other words, the cam mechanism 80 creates the movements of the dies 51 and the punches 52 of the shaping press pairs 50 located at the even-numbered positions and those of the shaping press pairs 50 located at the odd-numbered positions independently of each other, thus facilitating the ease with which the movements of the shaping press pairs 50 required to form the coil-end portions 42 and the in-slot portions 40 are established.

The output step is established by advancing the shaping press pairs 50 along the travel path in contact with the cam mechanism 80 and also moving the dies 51 and the punches 52 thereof in opposite directions perpendicular to the length of the insulator-coated flat wire 30 (i.e., the travel path) to release the insulator-coated flat wire 30, thus ensuring the stability in discharging the insulator-coated flat wire 30 from the stator coil production machine.

The stator coil production machine is, as described above, equipped with the shaping press pairs 50, the rotary retainers 60, the rail cams 70, and the cam mechanism 80. This structure serves to decrease the time required to shape the insulator-coated flat wire 30 and improve the productivity thereof. Additionally, the cam mechanism 80 ensures the stability in establishing the movement of the shaping press pairs 50 required in the coil-end portion shaping step and the in-slot portion shaping step.

The thirteen shaping press pairs 50 are used in the above embodiment, but the required number of the shaping press pairs 50 is preferably determined based on the number of the coil-end portions 42 required to be formed in the insulator-coated flat wire 30.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A method of producing a stator coil which is to be wound through slots of a stator core of a stator for use in an electric rotating machine using a plurality of shaping press pairs each of which has press members opposed to each other across a looped travel path along which an insulator-coated conductor wire is to be traveled, a rotary retainer through which the shaping press pairs are retained and arrayed away from each other, the rotary retainer rotating to move the shaping press pairs along the travel path, a rail cam which defines the travel path, and a cam mechanism which defines movements of the shaping press pairs in a direction substantially perpendicular to a length of the insulator-coated conductor wire traveling along the travel path, the method comprising:

a coil-end portion shaping step of bringing the press members of each of the shaping press pairs close to each other in sequence to shape portions of the insulator-coated conductor wire into coil-end portions which are to be disposed outside the stator core; and an in-slot portion shaping step of advancing the shaping press pairs on the travel path and also moving selected ones of the shaping press pairs through the cam mechanism in sequence in the direction perpendicular to the length of the insulator-coated conductor wire to shape portions of the insulator-coated conductor wire into in-slot portions each of which leads to one of the coil-end portions and which are to be disposed in the slots of the stator core, thereby producing the insulator-coated conductor wire as the stator coil.

2. The method as set forth in claim 1, wherein ones of the shaping press pairs which are undergoing the in-slot portion shaping step are broken down into a first group and a second group, each of the shaping press pairs of the first group being disposed between every adjacent two of the shaping press pairs of the second group, and wherein the shaping press pairs of the first group are moved in the direction perpendicular to the travel path, while the shaping press pairs of the second group are held from moving in the direction perpendicular to the travel path.

3. The method as set forth in claim 1, wherein the in-slot portion shaping step advances the shaping press pairs on the travel path and simultaneously moves the selected ones of the shaping press pairs the direction perpendicular to the travel path.

4. The method as set forth in claim 1, wherein the rail cam works to move the shaping press pairs so as to decrease distances between themselves and the center of the rotary retainer decrease gradually during the in-slot portion shaping step, thereby decreasing an interval between adjacent two of the shaping press pairs which are undergoing the in-slot portion shaping step.

5. The method as set forth in claim 1, wherein the cam mechanism defines a first guide path, a second guide path, a third guide path, and a fourth guide path, the first guide path creating movement of one of the press members of the shaping press pairs located at odd-numbered positions, the second guide path creating movement of the other of the press members of the shaping press pairs located at the odd-numbered positions, the third guide path creating movement of one of the press members of the shaping press pairs located at even-numbered positions, and the fourth guide path creating movement of the other of the press members of the shaping press pairs located at the even-numbered positions.

6. The method as set forth in claim 1, further comprising an input step of inputting the insulator-coated conductor wire to the travel path and an output step of outputting the insulator-coated conductor wire from the shaping press pairs, and wherein the output step advances each of the shaping press pairs in contact with the cam mechanism and also moves the press members of each of the shaping press pairs away from each other to release the insulator-coated conductor wire.

* * * * *